(12) United States Patent
Clarke et al.

(10) Patent No.: US 11,892,659 B2
(45) Date of Patent: Feb. 6, 2024

(54) ADAPTIVE RESOLUTION FOR MULTI-VIEW DISPLAY SYSTEM AND METHOD THEREOF

(71) Applicant: Samsung Electronics Co., Ltd., Suwon-si (KR)

(72) Inventors: Nigel A Clarke, Mountain View, CA (US); Sergio Perdices-Gonzalez, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/810,220

(22) Filed: Jun. 30, 2022

(65) Prior Publication Data

US 2022/0334376 A1  Oct. 20, 2022

Related U.S. Application Data

(63) Continuation of application No. 16/354,057, filed on Mar. 14, 2019, now Pat. No. 11,415,793.
(Continued)

(51) Int. Cl.
*G02B 30/28* (2020.01)
*G02B 3/00* (2006.01)
(Continued)

(52) U.S. Cl.
CPC ............. *G02B 30/28* (2020.01); *G02B 3/005* (2013.01); *G02B 26/004* (2013.01);
(Continued)

(58) Field of Classification Search
CPC ........................ G02B 30/24; G02B 30/26–28
(Continued)

(56) References Cited

U.S. PATENT DOCUMENTS

| 4,641,178 A | * | 2/1987 | Street | G02B 30/23 |
| | | | | 348/E13.058 |
| 5,493,427 A | | 2/1996 | Nomura et al. | |

(Continued)

FOREIGN PATENT DOCUMENTS

| CN | 105676518 A | 6/2016 |
| EP | 1777097 A2 | 4/2007 |

(Continued)

OTHER PUBLICATIONS

Partial European Search Report dated Mar. 17, 2020 in connection with European Patent Application No. 19217992, 29 pages.
(Continued)

*Primary Examiner* — Zachary W Wilkes

(57) ABSTRACT

An apparatus includes a display device having a lenticular layer. The lenticular layer includes (i) a first side, (ii) a second side opposite the first side, and (iii) particles in a fluid medium between the first and second sides of the lenticular layer. The second side of the lenticular layer includes lens elements forming a lenticular array. The particles of the lenticular layer are configured to move within the fluid medium such that (i) the lens elements are filled with the particles in a first mode or (ii) the lens elements are filled with the fluid medium in a second mode. The display device is configured to operate as a directional display in one of the first and second modes and as a single display in another of the first and second modes.

20 Claims, 17 Drawing Sheets

DIRECTIONAL MODE

SINGLE DIRECTION MODE

Related U.S. Application Data

(60) Provisional application No. 62/786,725, filed on Dec. 31, 2018.

(51) Int. Cl.

| | |
|---|---|
| *G02B 26/00* | (2006.01) |
| *G02B 3/12* | (2006.01) |
| *G06F 3/01* | (2006.01) |
| *G09G 3/02* | (2006.01) |
| *G09G 5/14* | (2006.01) |

(52) U.S. Cl.
CPC ............ *G02B 26/005* (2013.01); *G06F 3/011* (2013.01); *G09G 3/025* (2013.01); *G09G 5/14* (2013.01); *G02B 3/12* (2013.01); *G09G 2320/028* (2013.01); *G09G 2320/0257* (2013.01); *G09G 2320/068* (2013.01); *G09G 2320/0693* (2013.01); *G09G 2354/00* (2013.01)

(58) Field of Classification Search
USPC ........................................ 359/296, 458, 665
See application file for complete search history.

(56) References Cited

U.S. PATENT DOCUMENTS

| | | | |
|---|---|---|---|
| 6,967,763 B2 | 11/2005 | Fujii et al. | |
| 7,474,466 B2 | 1/2009 | Hashimoto et al. | |
| 7,623,188 B2 | 11/2009 | Hamagishi | |
| 7,688,509 B2 * | 3/2010 | Vissenberg | G02B 30/28 |
| | | | 359/464 |
| 7,733,569 B2 | 6/2010 | Hamagishi | |
| 8,223,279 B2 | 7/2012 | Zheng et al. | |
| 8,233,114 B2 | 7/2012 | Mimura et al. | |
| 8,300,206 B2 | 10/2012 | Kim et al. | |
| 8,330,806 B2 | 12/2012 | Yun et al. | |
| 8,564,874 B2 | 10/2013 | Chen | |
| 8,659,739 B2 | 2/2014 | Baek et al. | |
| 8,922,893 B2 | 12/2014 | Koshiishi et al. | |
| 9,019,449 B2 | 4/2015 | Baek et al. | |
| 9,196,212 B2 * | 11/2015 | Lee | H04N 13/356 |
| 9,300,948 B2 | 3/2016 | Cho et al. | |
| 9,482,873 B2 | 11/2016 | Lin | |
| 9,599,874 B2 | 3/2017 | Mather et al. | |
| 9,778,470 B2 | 10/2017 | Pijlman et al. | |
| 9,804,294 B2 | 10/2017 | Lin et al. | |
| 2004/0263971 A1 * | 12/2004 | Lipton | G02B 30/27 |
| | | | 359/463 |
| 2006/0158729 A1 * | 7/2006 | Vissenberg | G02B 30/28 |
| | | | 359/462 |
| 2006/0203336 A1 | 9/2006 | Van Berkel et al. | |
| 2006/0221444 A1 | 10/2006 | Fukaishi et al. | |
| 2006/0244682 A1 * | 11/2006 | Brueggert | G02B 30/27 |
| | | | 359/475 |
| 2007/0195409 A1 | 8/2007 | Yun et al. | |
| 2007/0296874 A1 | 12/2007 | Yoshimoto et al. | |
| 2011/0211345 A1 * | 9/2011 | De Boer | G02F 1/133603 |
| | | | 362/235 |
| 2011/0310233 A1 | 12/2011 | Bathiche et al. | |
| 2012/0249537 A1 | 10/2012 | Bae et al. | |
| 2012/0250141 A1 * | 10/2012 | Chen | G02F 1/167 |
| | | | 348/E13.075 |
| 2013/0120837 A1 | 5/2013 | Zuidema et al. | |
| 2013/0160942 A1 | 6/2013 | Zuidema | |
| 2013/0201547 A1 | 8/2013 | Cho et al. | |
| 2013/0321720 A1 | 12/2013 | Inada | |
| 2015/0070740 A1 | 3/2015 | Zarrabi et al. | |
| 2015/0309385 A1 | 10/2015 | Shu et al. | |
| 2015/0316776 A1 | 11/2015 | Gao et al. | |
| 2020/0218084 A1 | 7/2020 | Zhu et al. | |

FOREIGN PATENT DOCUMENTS

| | | |
|---|---|---|
| KR | 10-20140025784 A | 3/2014 |
| KR | 10-20160051404 A | 5/2016 |

OTHER PUBLICATIONS

European Search Report dated May 7, 2020 in connection with European Patent Application No. 19217992, 30 pages.
International Search Report and Written Opinion of the International Searching Authority dated Apr. 2, 2020 in connection with International Patent Application No. PCT/KR2019/017989, 13 pages.
Communication pursuant to Article 94(3) EPC dated Dec. 15, 2020 in connection with European Patent Application No. 19218003.2, 14 pages.
Communication pursuant to Article 94(3) EPC dated May 19, 2021 in connection with European Patent Application No. 19217992.7, 13 pages.
Summons to attend oral proceedings pursuant to Rule 115(1) EPC dated Aug. 12, 2021 in connection with European Application No. 19218003.2, 23 pages.

* cited by examiner

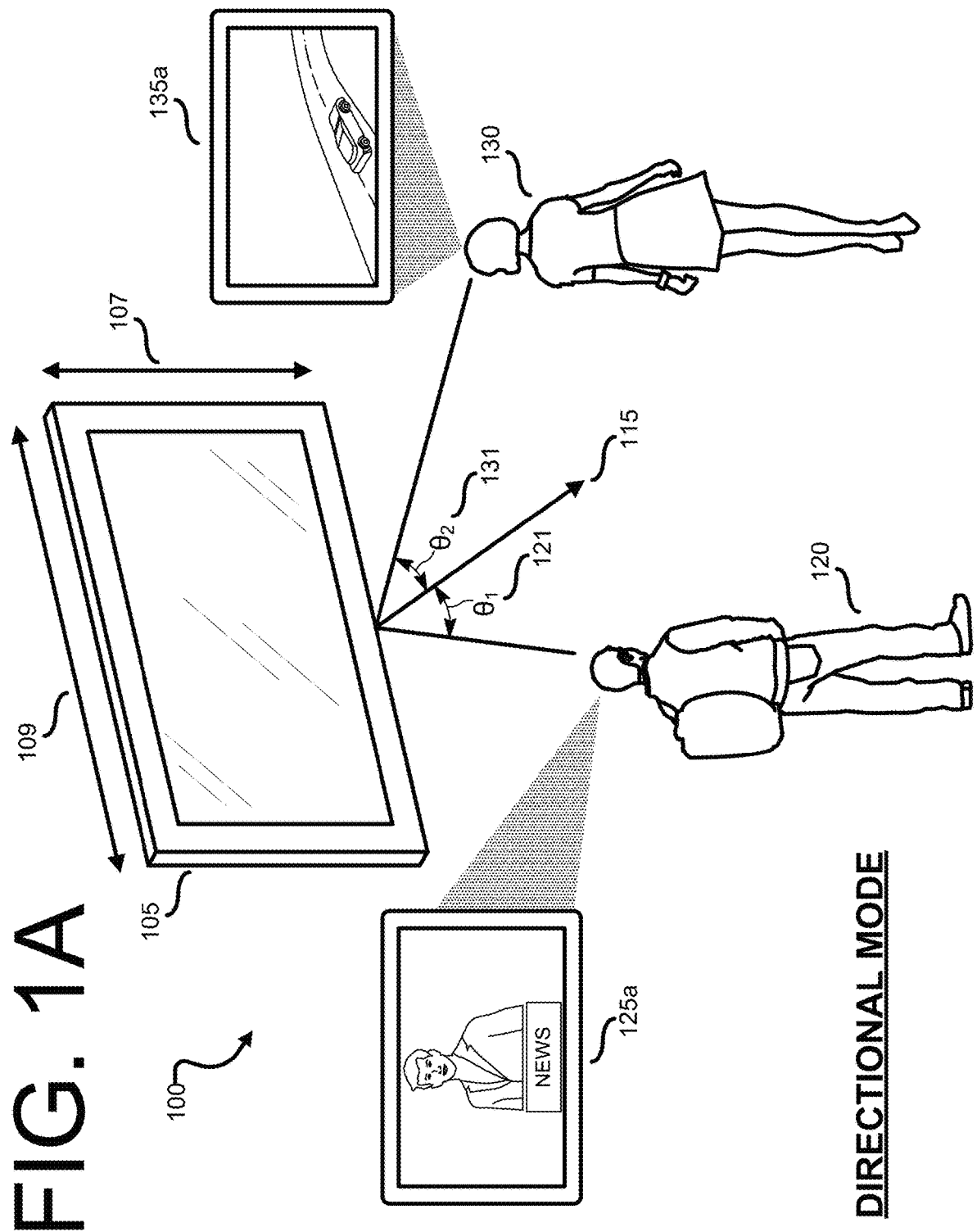

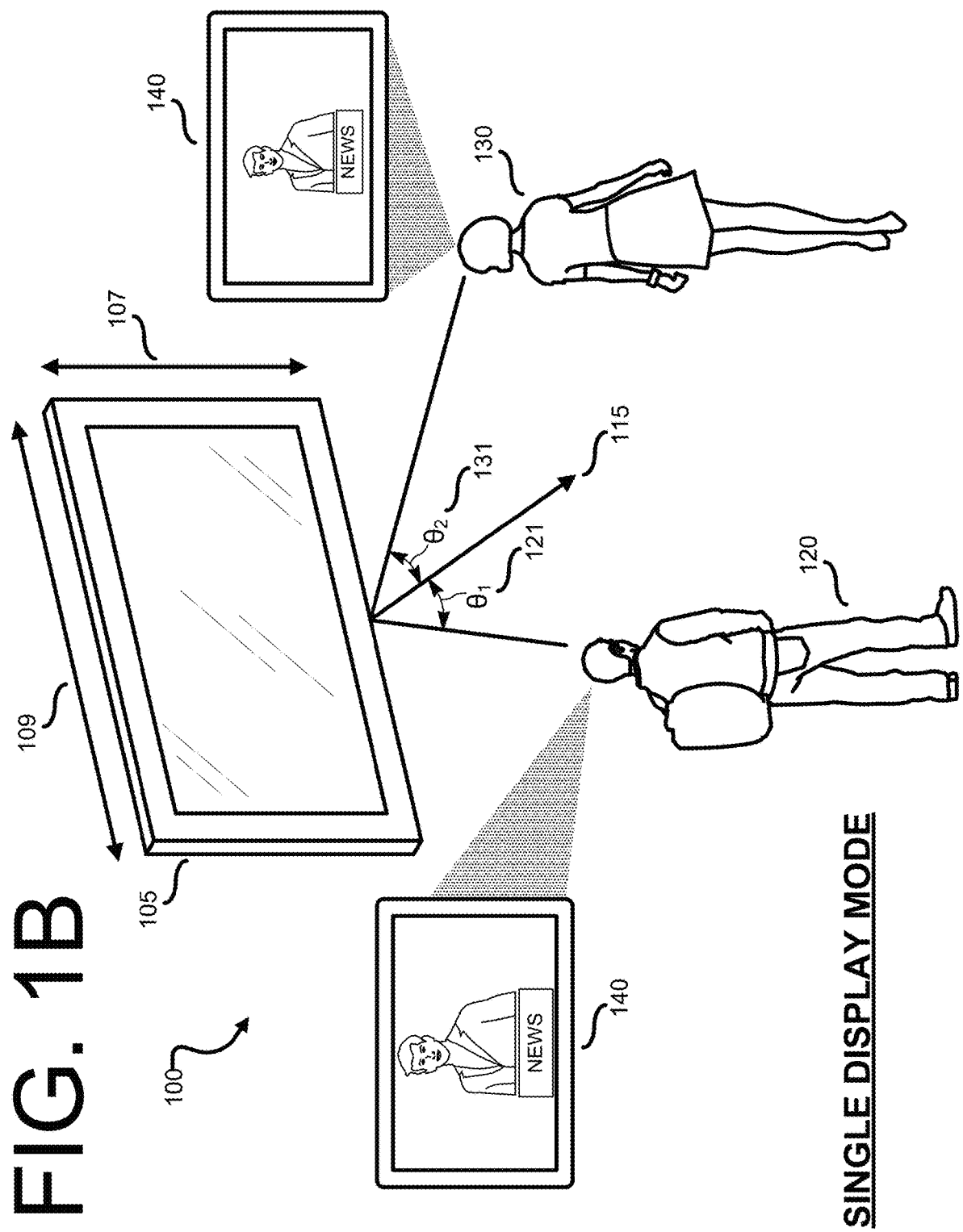

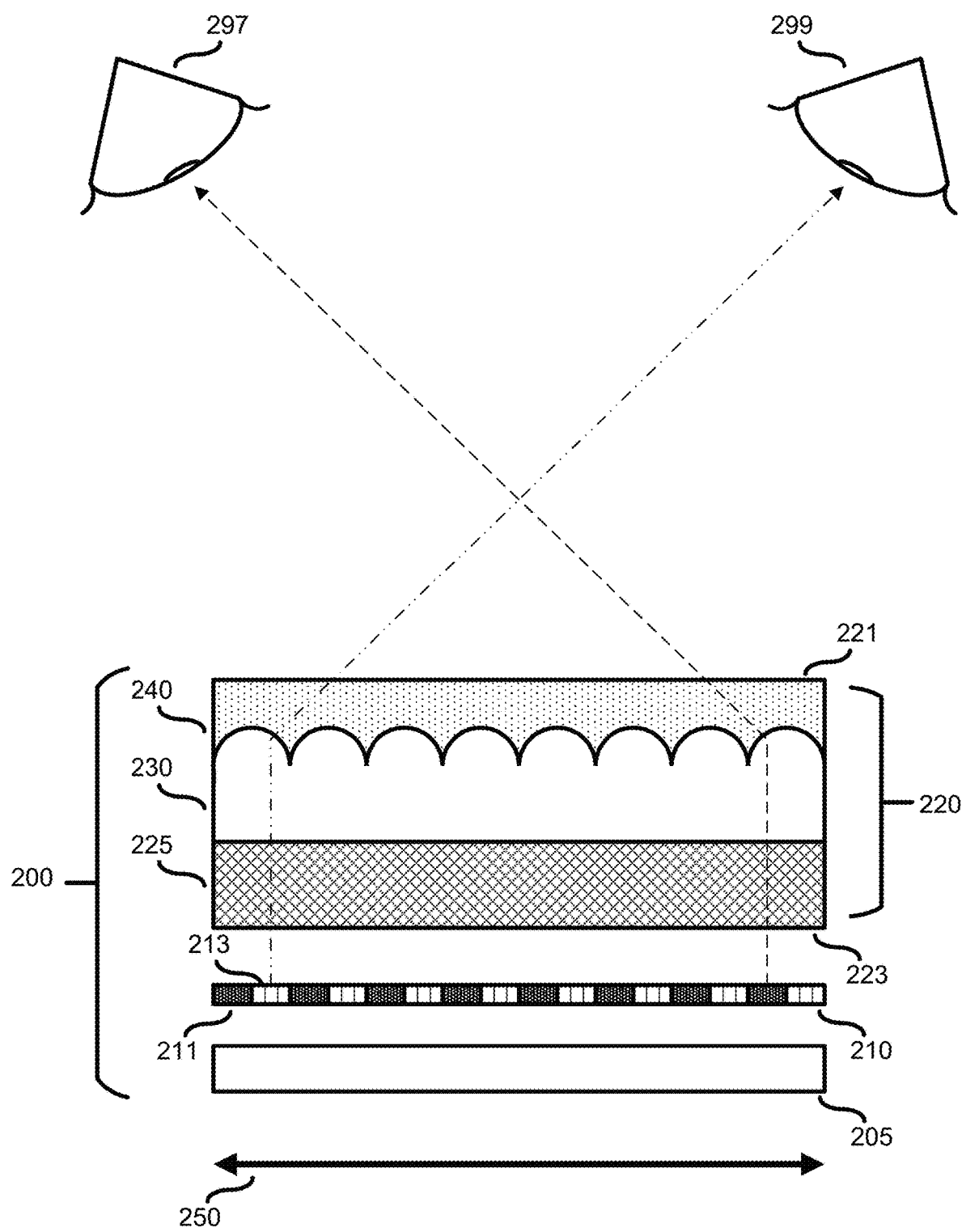

FIG. 7
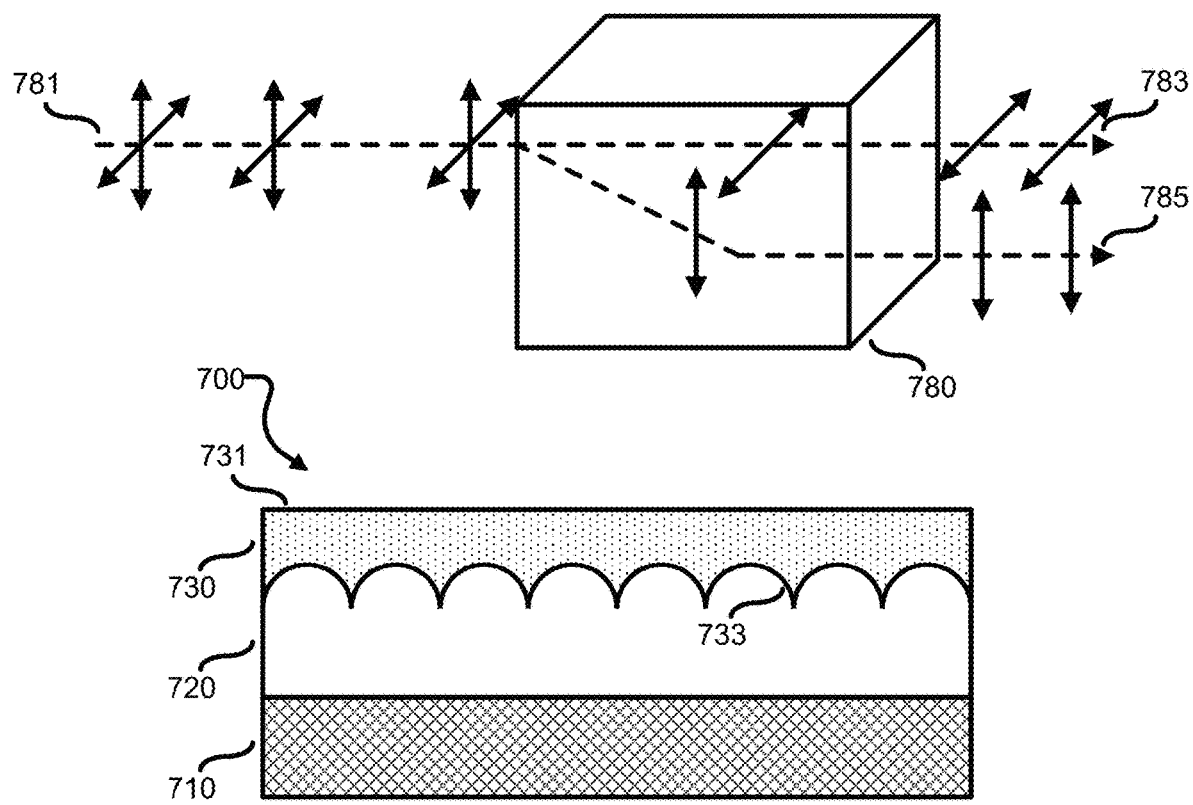
DIRECTIONAL MODE
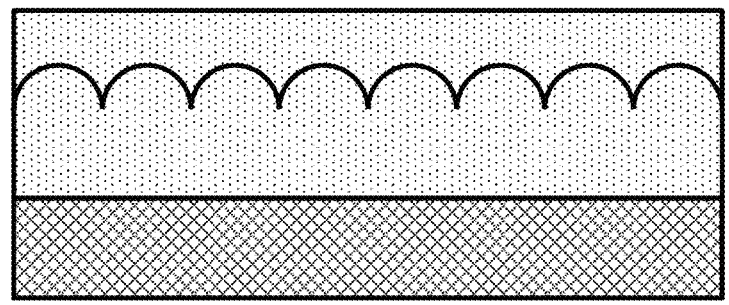
SINGLE DISPLAY MODE

FIG. 8
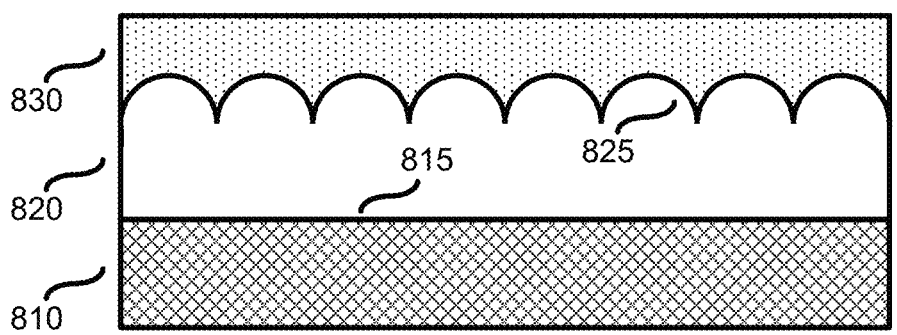
FIRST DIRECTIONAL MODE
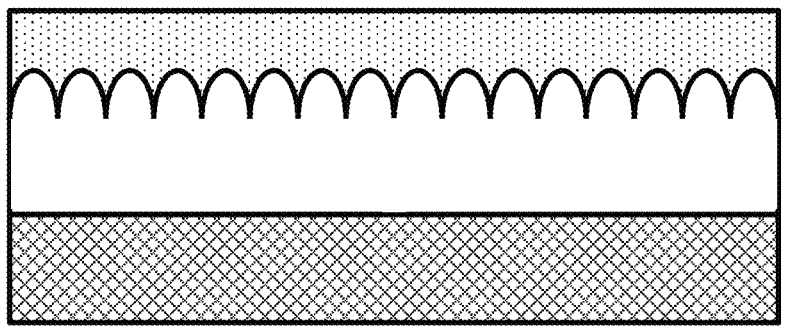
SECOND DIRECTIONAL MODE
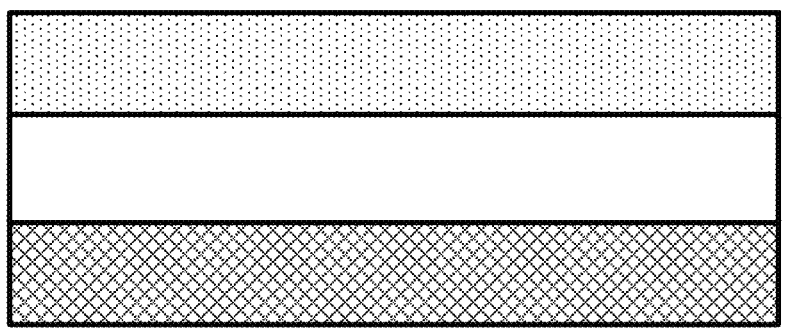
SINGLE DISPLAY MODE

FIG. 9
FIRST POSITION
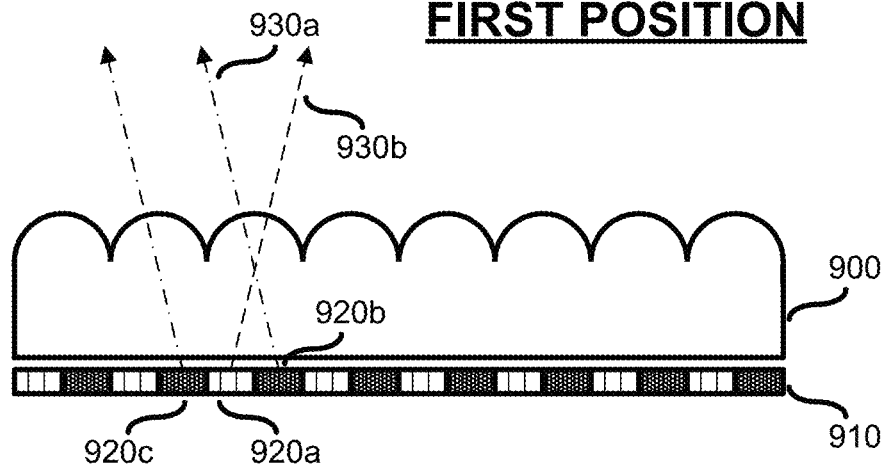
SECOND POSITION
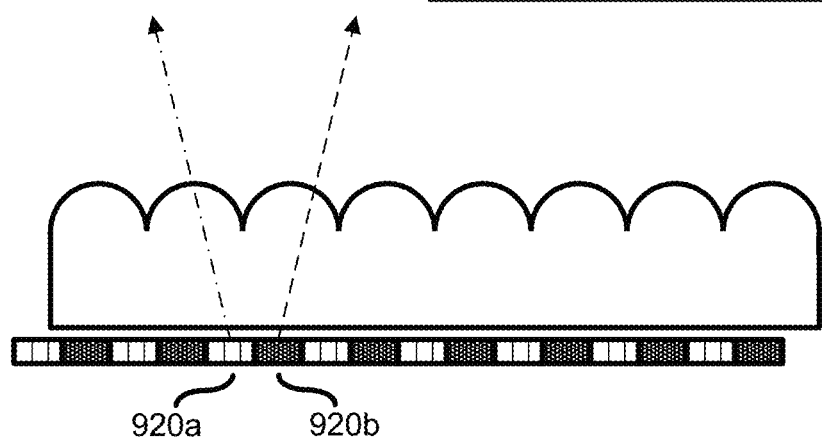
MULTIPLEXED
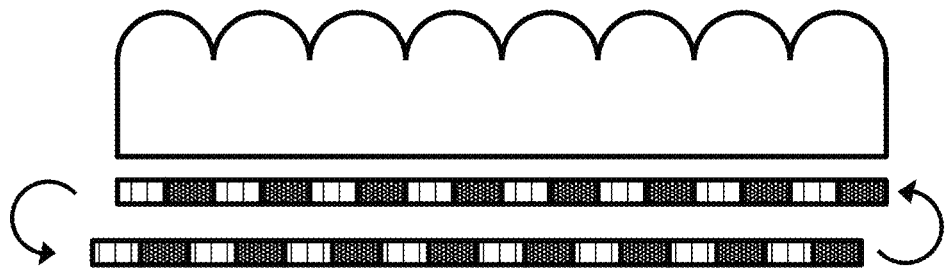

FIG. 10
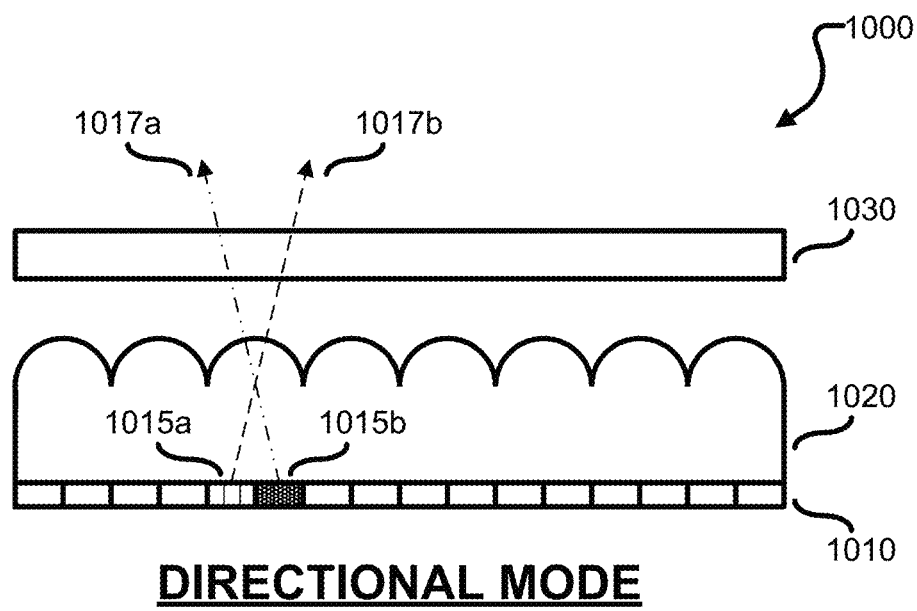
DIRECTIONAL MODE
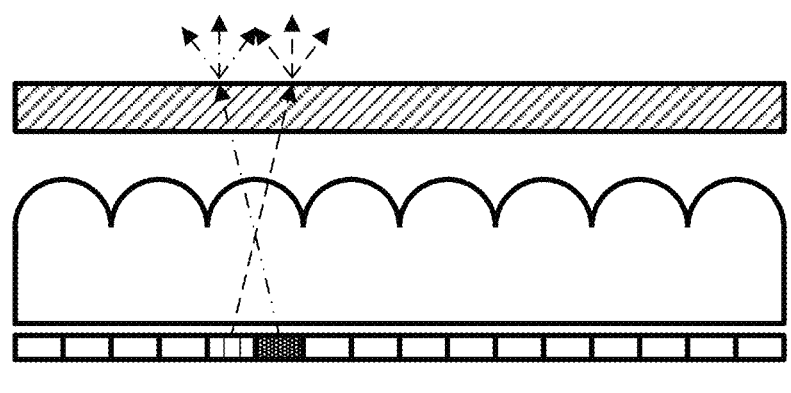
SINGLE DISPLAY MODE

FIG. 11
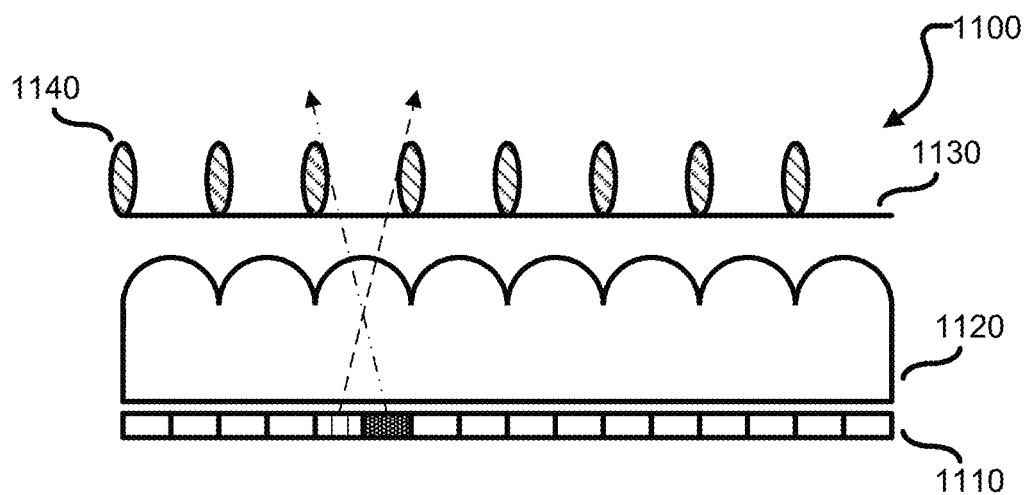
DIRECTIONAL MODE
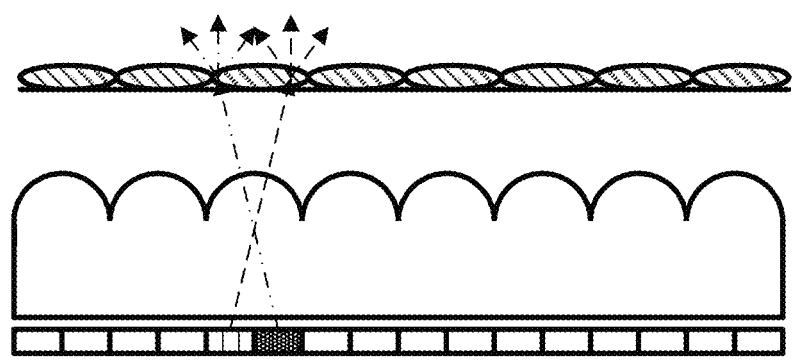
SINGLE DISPLAY MODE

FIG. 12
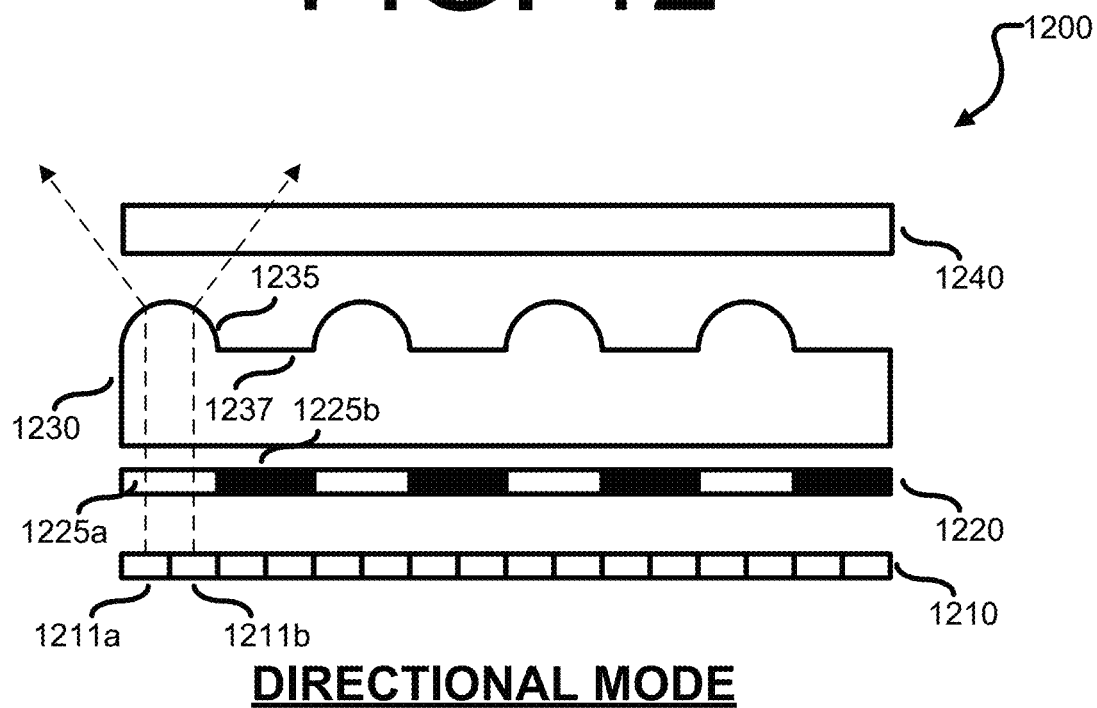
DIRECTIONAL MODE
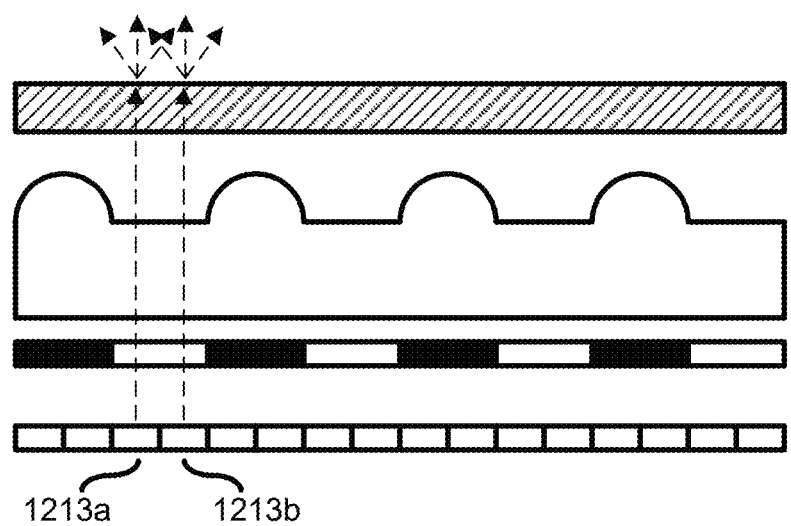
SINGLE DISPLAY MODE

ADJUST SWITCHABLE DIFFUSER DISPOSED IN FRONT OF LENTICULAR LAYER TO PROVIDE AT LEAST ONE DIRECTIONAL DISPLAY — 1510

ADJUST SWITCHABLE DIFFUSER TO PROVIDE A SINGLE DISPLAY — 1520

ADAPTIVE RESOLUTION FOR MULTI-VIEW DISPLAY SYSTEM AND METHOD THEREOF

CROSS-REFERENCE TO RELATED APPLICATIONS AND CLAIM OF PRIORITY

This application claims priority under 35 U.S.C. § 120 as a continuation of U.S. patent application Ser. No. 16/354,057 filed on Mar. 14, 2019, which claims priority under 35 U.S.C. § 119(e) to U.S. Provisional Patent Application No. 62/786,725 filed on Dec. 31, 2018. Both of these patent applications are hereby incorporated by reference in their entirety.

TECHNICAL FIELD

This disclosure relates generally to electronic displays. More specifically, this disclosure relates to systems and methods for providing an adaptive resolution for a multi-view display system and method thereof.

BACKGROUND

Directional displays, or screens which have the ability to provide separate displays across different viewing angles, present exciting opportunities for more effectively utilizing the energy and space consumed by the display apparatus (for example, enabling adults to watch programs of parental interest while their children watch cartoons), opportunities and technical challenges associated with fully realizing the potential of display apparatus which support directional displays remain. For example, controlling the directionality and resolution of displays provided by the display apparatus remains a source of opportunities and technical challenges.

SUMMARY

This disclosure provides an adaptive resolution for a multi-view display system and method thereof.

In a first embodiment, an apparatus includes a display device having a lenticular layer. The lenticular layer includes (i) a first side, (ii) a second side opposite the first side, and (iii) particles in a fluid medium between the first and second sides of the lenticular layer. The second side of the lenticular layer includes lens elements forming a lenticular array. The particles of the lenticular layer are configured to move within the fluid medium such that (i) the lens elements are filled with the particles in a first mode or (ii) the lens elements are filled with the fluid medium in a second mode. The display device is configured to operate as a directional display in one of the first and second modes and as a single display in another of the first and second modes.

In a second embodiment, a system includes a display device having a lenticular layer. The lenticular layer includes (i) a first side, (ii) a second side opposite the first side, and (iii) particles in a fluid medium between the first and second sides of the lenticular layer. The second side of the lenticular layer includes lens elements forming a lenticular array. The system also includes at least one processor configured to selectively control whether the display device operates in a first mode or a second mode. The particles of the lenticular layer are configured to move within the fluid medium such that (i) the lens elements are filled with the particles in the first mode or (ii) the lens elements are filled with the fluid medium in the second mode. The display device is configured to operate as a directional display in one of the first and second modes and as a single display in another of the first and second modes.

In a third embodiment, a method is provided for controlling a display device having a lenticular layer. The lenticular layer includes (i) a first side, (ii) a second side opposite the first side, and (iii) particles in a fluid medium between the first and second sides of the lenticular layer. The second side of the lenticular layer includes lens elements forming a lenticular array. The method includes moving the particles within the fluid medium such that the lens elements are filled with the particles in a first mode or moving the particles within the fluid medium such that the lens elements are filled with the fluid medium in a second mode. The display device operates as a directional display in one of the first and second modes and as a single display in another of the first and second modes.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1A illustrates an example of a scene that includes a display apparatus operating in a mode providing multiple directional displays, according to embodiments of this disclosure;

FIG. 1B illustrates an example of a scene that includes a display apparatus supporting multiple directional displays operating in a single display mode, according to embodiments of this disclosure;

FIG. 2 illustrates elements of a display apparatus supporting adaptive resolution for multi-view displays according to embodiments of this disclosure;

FIG. 7 illustrates components of a display apparatus utilizing a birefringent material to support a directional display and single display modes according to embodiments of this disclosure;

FIG. 8 illustrates components of a display apparatus utilizing a deformable lenticular array according to embodiments of this disclosure;

FIG. 9 illustrates components of a display apparatus supporting a high refresh rate providing the appearance of enhanced resolution across directional displays according to embodiments of this disclosure;

FIG. 10 illustrates components of a display apparatus comprising a switchable diffuser according to embodiments of this disclosure;

FIG. 11 illustrates components of a display apparatus comprising a switchable diffuser according to embodiments of this disclosure;

FIG. 12 illustrates components of a display apparatus supporting multiple viewing modes and having an active shutter panel according to embodiments of this disclosure;

DETAILED DESCRIPTION

Figure 3:
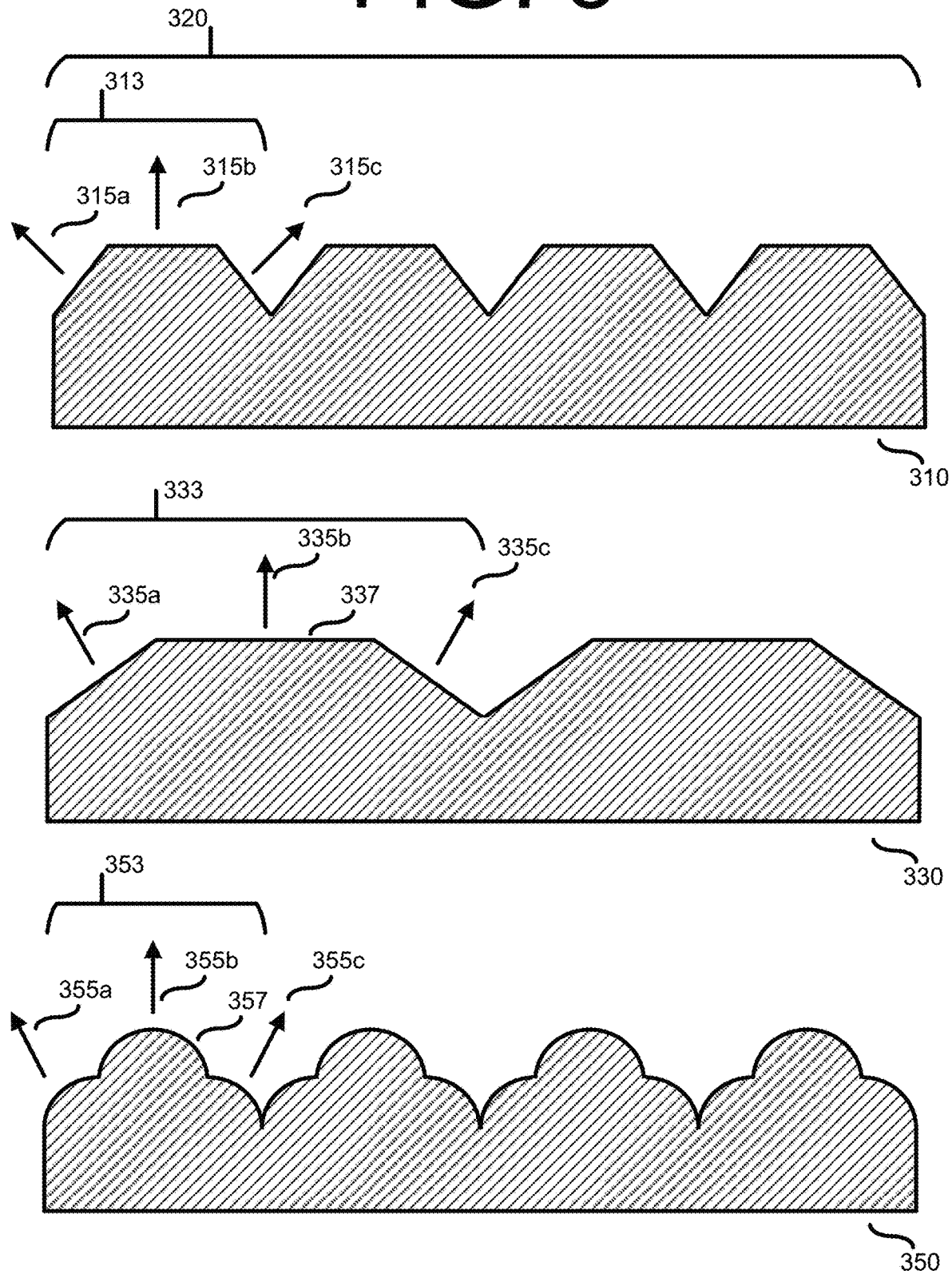
FIG. 3 illustrates examples of lenticularly patterned material of a display apparatus supporting multiple directional displays according to embodiments of this disclosure.

FIGS. 1A through 16, discussed below, and the various embodiments used to describe the principles of this disclosure in this patent document are by way of illustration only and should not be construed in any way to limit the scope of the disclosure. Those skilled in the art will understand that the principles of this disclosure may be implemented across a wide range of display technologies, including illuminated displays (for example, backlit displays with color filters, or organic light emitting diode (OLED) displays), as well as reflective displays (for example, displays using electronic ink, or displays using bistable materials).

FIG. 1A illustrates an example of a scene 100 that includes a display apparatus operating in a mode providing multiple directional displays, according to embodiments of this disclosure. The embodiment of the scene 100 shown in FIG. 1A is for illustration only and other examples could be used without departing from the scope of the present disclosure.

In the non-limiting example shown in FIG. 1A, the elements of scene 100 comprise a display apparatus 105, a first viewer 120, and a second viewer 130. According to various embodiments of this disclosure, display apparatus 105 comprises a pixelated array comprising pixels disposed in a pattern that repeats at a first spacing along a first axis 107 and at a second spacing along a second axis 109. In certain embodiments, each constituent pixel of the pixelated array may further comprise one or more subpixels (for example, a red subpixel, a green subpixel and a blue subpixel) disposed according to a subpixel pattern. In various embodiments, display apparatus 105 further comprises an optical member, such as a lenticular array, having an optical feature (for example, a curved cross section) pattern which runs along first axis 107 and repeats at a specified spacing along second axis 109. In the non-limiting example of FIG. 1A, and the non-limiting example depicted in FIG. 1B below, in a first mode of operation, the optical feature of display apparatus 105 directs light from a first set of lines of pixels of the pixelated array belonging to a first set of coordinates along second axis 109 in a first direction, and directs light from a second set of lines of pixels of the pixelated array belonging to a second set of coordinates along second axis 109 in a second direction, the second direction being different from the first direction.

According to various embodiments, the operation of the optical member in the first mode of operation of display apparatus 105 creates two directional displays. Depending upon the geometry of the repeating optical feature of the optical array, viewers within a first range of angles in a plane defined by second axis 109 and third axis 115 will primarily see images appearing on pixels from the first set of lines of pixels. Similarly, viewers within a second range of angles in the plane defined by second axis 109 and third axis 115 will primarily see images which appear on pixels from the second set of lines of pixels.

Referring to the non-limiting example of FIG. 1A, first viewer 120 is looking at display apparatus 105 at a first viewing angle 121, which is within the first range of angles in the plane defined by second axis 109 and third axis 115. Accordingly, first viewer primarily sees images appearing on pixels from the first set of lines of pixels. Leveraging the fact that only a known subset of the total pixels of display apparatus 105 are visible to the first viewer, pixel control logic within display apparatus 105, or a graphics pipeline of a source device to display apparatus 105 renders content from a first source to be presented on only pixels from the first set of lines of pixels. Accordingly, first viewer 120 sees first directional display 125a, which displays content from a news program. Similarly, second viewer 130 is looking at display apparatus 105 from a second viewing angle 131, which is within the second range of angles in the plane defined by second axis 109 and third axis 115. Again, due to the structure and geometry of an optical member of the display apparatus, primarily the pixels of display apparatus 105 belonging to the second set of lines of pixels are visible to second viewer 130. Pixel control logic (for example, a rasterizer or graphics processing unit) within display apparatus 105 or a graphics pipeline of a source device (for example, a laptop computer) to display apparatus 105 renders content from a second source to be presented on only pixels from the second set of lines of pixels. Accordingly, when looking at display apparatus 105 at second viewing angle 131, second viewer sees a second directional display 135a associated with content from the second source (in this example, a driving scene from a movie).

FIG. 1B illustrates another example of the scene 100 that includes a display apparatus supporting multiple directional displays operating in a single display mode, according to embodiments of this disclosure. The embodiment of the scene 100 shown in FIG. 1B is for illustration only and other examples could be used without departing from the scope of the present disclosure.

In the non-limiting example of FIG. 1B, the display apparatus 105 of FIG. 1A, and first and second viewers 120 and 130 are shown again. For the purposes of this illustrative example, first viewer 120 is, once again, looking at display apparatus 105 at first viewing angle 121, and second viewer 130 is likewise, looking at display apparatus 105 from second viewing angle 131. However, in the example shown in FIG. 1B, display apparatus 105 is in a single display mode, and both viewers are seeing the same image. Specifically, both first viewer 120 and second viewer 130 are seeing single display 140. According to various embodiments, single display 140 has a higher resolution than both first directional display 125a and second directional display 135a. Further, in some embodiments, single display 140 comprises content rendered from a single source. As shown in FIG. 1i, when display apparatus 105 is in single display mode, both first viewer 120 and second viewer 130 are watching single display of a news program.

FIG. 2 illustrates elements of a display apparatus supporting adaptive resolution for multi-view displays according to some embodiments of this disclosure. The embodiment of the display apparatus shown in FIG. 2 is for illustration only and other examples could be used without departing from the scope of the present disclosure.

In the non-limiting example shown in FIG. 2, a display apparatus 200 is shown, as well as a first viewing position 297 and a second viewing position 299. In this illustrative example, first viewing position 297 is disposed at an angle relative to display apparatus 200 within a first range of viewing angles, and second viewing position 299 is disposed at an angle within a second range of viewing angles. According to various embodiments, when display apparatus 200 is in a multi-view mode of operation, viewing positions located within the first range of viewing angles (for example, first viewing position 297) primarily see content rendered by a first set of lines of pixels of display apparatus 200, and viewing positions within the second range of viewing angles (for example, second viewing position 299) primarily see content rendered by a second set of lines of pixels of display apparatus 200.

According to certain embodiments, display apparatus 200 is a "flat screen" display (for example, a television, computer monitor, or tablet screen). In the non-limiting example of FIG. 2, display apparatus 200 comprises backlight 205, which contains one or more light sources (for example, light emitting diodes or a cold cathode fluorescent lamp ("CCFL")) emitting light at visible frequencies which can be filtered by the pixels of color filter 210. According to some embodiments, backlight 205 further comprises a diffuser or light guide to ensure that the backlight produces even light. In some embodiments, backlight 205 is dynamically and or locally controlled to improve energy consumption and the dynamic range of the display (for example, by producing darker blacks).

In some embodiments, display apparatus 200 comprises color filter 210, which is disposed between backlight 205 and first and second viewing positions 297 and 299. As shown in the illustrative example of FIG. 2, color filter 210 comprises a plurality of pixels (for example, first pixel 211 and second pixel 213) repeating at a regular spacing along axis 250. According to various embodiments, first pixel 211 comprises one or more sub pixels associated with a color channel of a color model (for example, red-green-blue ("RGB")) through which light from backlight 205 passes. Each sub-pixel comprises liquid crystal display (LCD) filter, which is electronically controlled to control the passage of light from backlight 205 within a specified color channel. In certain embodiments, the combined operation of each sub-pixel of first pixel 211 allow first pixel 211 to appear as a point of light having a specified color and brightness.

Referring to the non-limiting example of FIG. 2, display apparatus 200 further comprises lenticular layer 220. According to various embodiments, lenticular layer 220 is a transparent sheet disposed between color filter 210 and first and second viewing positions 297 and 299. In certain embodiments, lenticular layer includes a substantially flat first exterior side 221 and a substantially flat second exterior side 223. In the non-limiting example of FIG. 2, first exterior side 221 is disposed on the exterior of display apparatus 200, and second exterior side 223 is disposed in front of both backlight 205 and color filter 210.

According to certain embodiments, lenticular layer 220 comprises a first layer 225, which is composed of a substantially transparent material (for example, silicon dioxide coated glass or polycarbonate) having an index of refraction which is uniform throughout first layer 225. In some embodiments, first layer 225 acts as a structural substrate, providing a solid mount for potentially more delicate layers, such as second layer 230. According to certain embodiments, first layer 225 acts as an optical spacer, to maintain a predetermined focal distance between lenticles of second layer 225 and color filter 210. According to certain embodiments, first layer 225 can be omitted, for example, when second layer 230 exhibits sufficient strength or obtains structural support from a different element of display apparatus 200.

In some embodiments, lenticular layer 220 comprises a second layer 230, which is composed of a section of material that is substantially flat on a side contacting first layer 225 and which has a lenticularly patterned cross section which repeats at a regular spacing along axis 250. According to certain embodiments, when the index of refraction of second layer 230 differs from the index of refraction of third layer 240, display apparatus 200 operates in a multidirectional mode, providing two or more directional displays, wherein the lenticularly patterned cross section of second layer 230 is configured to operate as a lens, and direct the light passing from a first set of pixels within color filter 210 to a first set of viewing angles, and direct the light passing from a second set of pixels within color filter 210 to a second set of viewing angles.

Further, as shown in the illustrative example of FIG. 2, when the index of refraction of second layer 230 differs from the index of refraction of third layer 240, a viewer at first viewing position 297 primarily sees light filtered by a first set of pixels, which includes first pixel 211 (identified in FIG. 2 as white dots on a black background). Similarly, when the index of refraction of second layer 230 differs from the index of refraction of third layer 240 a viewer at second viewing position 299 primarily sees light filtered by a second set of pixels, which includes second pixel 213 (identified in FIG. 2 by vertical cross hatching). According to various embodiments, including embodiments where second layer 230 is constructed using liquid-crystal infiltrated microcavities, the index of refraction of second layer 230 is variable, and can be tuned to match the index of refraction of third layer 240. In such embodiments, when the index of refraction of second layer 230 is tuned to match that of third layer 240, display apparatus is no longer operating in a multidirectional mode, and viewers at first viewing position 297 and second viewing position 299 see light filtered through substantially the same set of pixels of color filter 210.

As shown in the non-limiting example illustrated in FIG. 2, the lenticular layer 220 further includes a third layer 240. The third layer 240 further includes a first exterior side 221 and a second side following the contours of the lenticular pattern of second layer 230. According to various embodiments, the third layer 240 has at least one index of refraction that is different than the index of refraction of second layer 230. According to various embodiments, the index of refraction of third layer 240 is variable, and can be tuned to match the index of refraction of second layer 230 to support modes in which display apparatus 200 provides directional displays, and modes in which viewers of display apparatus 200 see light filtered through a substantially common subset of the pixels of color filter 210.

Although FIG. 2 illustrates one example of a display apparatus, various changes may be made to FIG. 2. For example, in certain embodiments (for example, organic light-emitting diode ("OLED")) displays, a single pixelated array of light emitting diodes may be serve as both backlight 205 and color filter 210. Additionally, in certain embodiments, second layer 230 may have a constant index of refraction, and the index of refraction of third layer 240 varies to match or differ from the index of refraction of second layer 230. Further, in certain embodiments, first layer 225 of lenticular layer 220 may be omitted.

FIG. 3 illustrates three examples of lenticularly patterned material of a display apparatus supporting multiple directional displays according to certain embodiments of this disclosure. The example embodiments of lenticularly patterned material shown in FIG. 3 are for illustration only and other embodiments could be used without departing from the scope of the present disclosure.

Referring to the non-limiting example of FIG. 3, a first section embodiment (i.e., a first section, a first portion, etc.) of lenticularly patterned material 310 includes a section of material having at least one possible index of refraction throughout the section of material. According to some embodiments, first section of lenticularly patterned material 310 is composed of a material having a generally constant index of refraction, such as polycarbonate or glass. According to some embodiments, first section of lenticularly patterned material 310 is constructed of a material having a controllably variable index of refraction (for example, a layer of polymer with liquid-crystal infiltrated microcavities).

As shown in the non-limiting example depicted in FIG. 3, the first section of lenticularly patterned material 310 comprises a substantially flat side 311 and a second side 320 defining a lenticularly patterned cross section made up of lens elements 313 which repeat at a regular spacing. According to certain embodiments, lens element 313 has a geometry that supports a first directional display visible along first viewing axis 315a, a second directional display visible along second viewing axis 315b, and a third directional display visible along third viewing axis 315c. In this illustrative example, the geometry of first section of lenticularly patterned material 310 is designed to split the resolution of a color filter (for example, color filter 210 in FIG. 2) equally between each of the three directional displays.

A second section embodiment (i.e., a second section, a second portion, etc.) of lenticularly patterned material 330 is shown as part of the non-limiting example of FIG. 3. According to certain embodiments, the second section of lenticularly patterned material 330 is constructed of a material having either a fixed or variable index of refraction, and includes a substantially flat side, and a second side defining a lenticularly patterned cross section composed of lens elements (for example, lens element 333), which repeat at a regular spacing. According to various embodiments, lens element 333 has a geometry that supports a first directional display along first viewing axis 335a, a second directional display along second viewing axis 335b and a third directional display along third viewing axis 335c. In certain embodiments, the geometry of lens element 333 is selected to split the resolution of a color filter feeding light to the substantially flat side of second section of lenticularly patterned material 330 unequally between the first, second and third directional displays. In this illustrative example, lens element 333 includes a wide land 337, which causes a larger proportion of the pixels (relative to the first and third directional displays) of a color filter providing light to second section of lenticularly patterned material 330 to be visible as part of the second directional display. In certain embodiments, having a higher resolution center directional display is more useful and may be utilized. For example, the center directional display may be displaying a movie or other item of resolution-critical content, while the side directional displays may be displaying less resolution-critical content (for example, text identifying the name and parental guidance rating of the movie being displayed through the center directional display).

A third section embodiment (i.e., a third section, a third portion, etc.) of lenticularly patterned material 350 is shown as part of the non-limiting example of FIG. 3. According to certain embodiments, the third section of lenticularly patterned material 350 is constructed of a material having either a fixed or variable index of refraction, and includes a substantially flat side, and a second side defining a lenticularly patterned cross section composed of lens elements 353, which repeat at a regular spacing. According to various embodiments, lens element 353 has a geometry which supports a first directional display along first viewing axis 355a, a second directional display along second viewing axis 355*b* and a third directional display along third viewing axis 355*c*. In certain embodiments, lens element 353 has a geometry that divides the pixels of a color filter evenly between the first, second and third directional displays, but which includes one or more additional curves 357 to create visual effects, such as a fisheye lens effect or orthoparallactic movement within a directional display.

While the non-limiting examples of FIG. 3 have described sections of lenticularly patterned material with lens elements supporting three directional displays, in some embodiments, different lens geometries supporting more or fewer directional displays may be utilized. For example, sections of lenticularly patterned according to embodiments of this disclosure also include sections of lenticularly patterned material in which the curve of the lens element is on a side of the material facing a pixelated array, instead of on a side facing a viewer.

Figure 4:
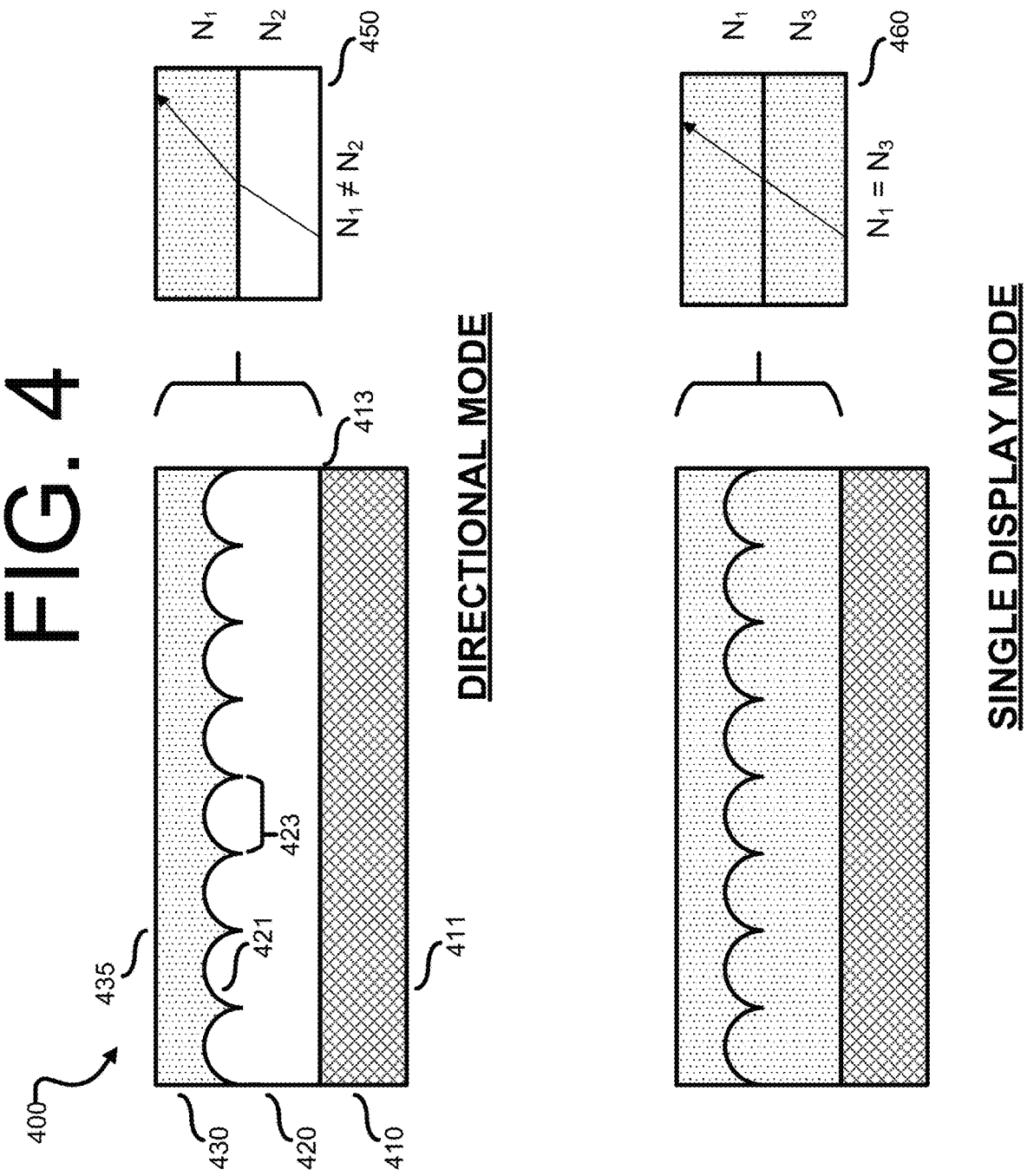
FIG. 4 illustrates components of a display apparatus supporting a single display mode and a directional display mode according to embodiments of this disclosure.

FIG. 4 illustrates components of a display apparatus supporting a single display mode and a directional display mode according to various embodiments of this disclosure. The embodiment of the display shown in FIG. 4 is for illustration only and other embodiments could be used without departing from the scope of the present disclosure. As with the non-limiting example of FIG. 3 and other examples described herein, in which a curved portion of a lenticular array faces a viewer, embodiments according to FIG. 4 include embodiments in which the curved portion of a lenticular array faces a color filter, and a flat side of the array faces a viewer.

In the non-limiting example shown in FIG. 4, the elements of a lenticular layer 400 (for example, lenticular layer 220 of FIG. 2) are shown in a directional mode of operation and a single display mode. According to various embodiments, lenticular layer 400 comprises a first layer 410 (for example, first layer 225 in FIG. 2) that is composed of a section of material having a substantially uniform index of refraction throughout, and first surface 411, which is substantially flat and disposed towards a backlight, OLED array or other pixelated light source providing content to be displayed in a directional mode of operation in which viewers within a first range of viewing angles primarily see content from a first set of pixels of a color filter, and viewers within a second range of viewing angles primarily see content from a second set of pixels of the color filter. First layer 410 further comprises a second surface 413 which is substantially flat.

According to various embodiments, lenticular layer 400 further includes a second layer 420 (for example, second layer 230 in FIG. 2). The second layer 420 further includes a first surface that is substantially flat and in contact with second surface 413 of first layer 410. Additionally, second layer 420 comprises a surface 421 that defines a lenticularly patterned cross section of second layer 420. According to certain embodiments, the lenticularly patterned cross section comprises a plurality of lens elements (for example, lens element 423) that repeat at a second spacing along an axis parallel to surface 413. As shown in the non-limiting example of FIG. 4, in a directional mode of display, the index of refraction of second layer 420 ($N_2$) differs from an index of refraction of third layer 430 ($N_1$), causing second layer 420 to act as an array of lenses that splits light entering the lenticular layer 400 via first layer 410 into two or more directional displays based on the light's point of incidence relative to a lens element of second layer 420. According to certain embodiments, second layer 420 is constructed of a material utilizing one or more of liquid crystals, phase change materials, or materials whose index of refraction is tunable.

As shown in the non-limiting example of FIG. 4, lenticular layer 400 further comprises a third layer 430 (for example, third layer 240 in FIG. 2). Third layer 430 includes a substantially flat surface 435, and a second surface tracking the contours of the lenticularly patterned cross section of second layer 420. Third layer 430 has an index of refraction ($N_1$), which when the lenticular layer 400 is supporting a directional mode, is different than an index of refraction ($N_2$) of second layer 420. As shown in graphic 450, the difference in the index of refraction along the line of intersection between second layer 420 and third layer 430 creates a refractive effect which changes the direction of light along the line of intersection between second layer 420 and third layer 430.

According to certain embodiments, the index of refraction of second layer 420 and/or third layer 430 is variable, and the indices of refraction of second layer 420 and third layer 430 can be tuned to match one another. For example, as shown in graphic 460, the index of refraction of second layer 420 is tunable and can be set to a value ($N_3$), which matches the index of refraction ($N_1$) of the third layer 430. When the indices of refraction are so tuned, the refractive effects associated with a change in index of refraction along the boundary between second layer 420 and third layer 430 do not occur, and viewing locations associated with separate directional displays when lenticular layer 400 is in a directional mode see light from a shared set of pixels of a color filter feeding light into lenticular layer 400. According to certain embodiments, in single display mode, viewers see a higher resolution, angularly-independent image than the directional displays provided when lenticular layer 400 is operating in a directional mode.

Figure 5:
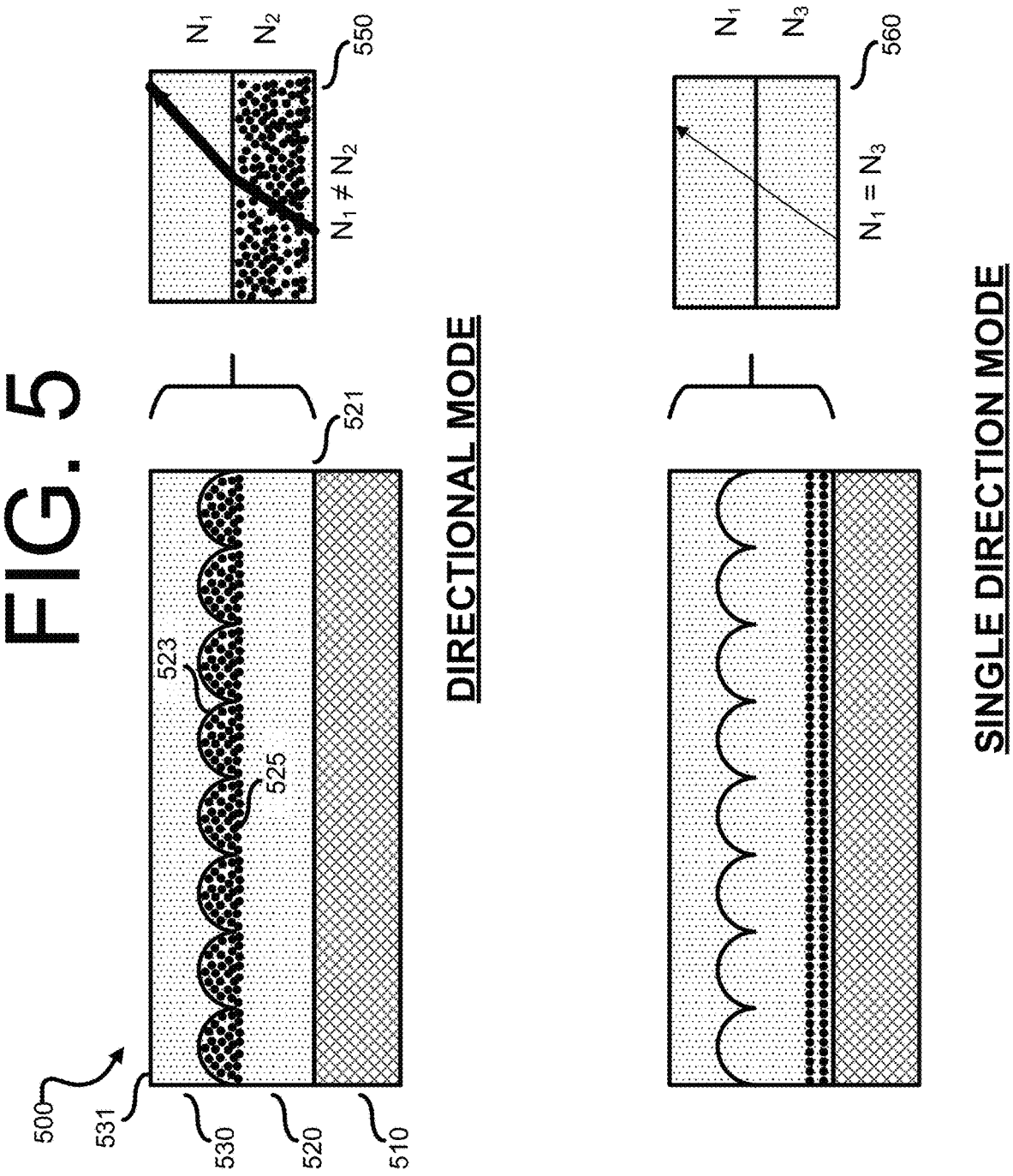
FIG. 5 illustrates components of a display apparatus supporting a single display mode and a directional display mode according to embodiments of this disclosure.

FIG. 5 illustrates an example of components of a display apparatus supporting a single display mode and a directional display mode according to some embodiments of this disclosure. The embodiment of the display shown in FIG. 5 is for illustration only and other embodiments could be used without departing from the scope of the present disclosure.

In the non-limiting example shown in FIG. 5, illustrations of a lenticular layer 500 in a directional mode of operation and a single display mode of operation are provided. Lenticular layer 500 comprises a first layer 510 (for example, first layer 225 in FIG. 2). The first layer 510 includes a layer of substantially transparent material (for example, glass or polycarbonate) having a uniform index of refraction throughout.

According to various embodiments, the lenticular layer 500 further comprises a second layer 520. The second layer 520 further includes a region having a substantially flat side 521 abutting first layer 510, and a second side 523 defining a lenticularly patterned cross section of second layer. As shown in the non-limiting example of FIG. 5, second layer 520 contains a volume of refractive particles 525 (for example, substantially transparent microbeads), which can be moved within second layer 520 in response to a control input (for example, a magnetic or electrostatic force applied to one side of lenticular layer 500). In some embodiments, second layer 520 is filled with a fluid medium (for example, a liquid or gel) which permits the movement of refractive particles 525 in response to the control input, and which has an index of refraction ($N_3$) matching the index of refraction ($N_1$) of third layer 530. According to the non-limiting example of FIG. 5, the fluid medium in second layer 520 and third layer 530 have the same index of refraction, and refractive particles 525 have a different index of refraction.

In some embodiments, lenticular layer 500 includes a third layer 530. The third layer 530 further includes a substantially flat first surface 531, and a second surface following the contour of second side 523 of second layer 520.

According to certain embodiments, when lenticular layer 500 is operating in a directional mode, refractive particles 525 are drawn towards second side 523 of second layer 520, thereby creating a contrast in the index of refraction between refractive particles and the index of refraction of third layer 530. As shown in graphic 550, by drawing refractive particles 525 towards the boundary between second layer 520 and third layer 530, a difference in the indices of refraction at the boundary between second layer 520 and third layer 530 is generated, which, in conjunction with the geometry of second layer 520, creates a lensing effect supporting multiple directional displays.

According to various embodiments, when operating in a single display mode, refractive particles 525 are drawn away from the boundary between second layer 520 and third layer 530, and, as shown in graphic 560, there is no change in index of refraction (e.g., $N_1 = N_3$) along the curved boundary between second layer 520 and third layer 530. Accordingly, there is no lensing effect, and viewers in ranges of viewing angles associated with separate directional displays in directional mode see a single display, which, in some embodiments, has a higher resolution than the directional displays provided in directional mode.

In some embodiments, the index of refraction of the fluid medium in second layer 520 and the index of refraction of third layer 530 are different, and refractive particles 525 have an index of refraction which matches that of third layer 530. According to such embodiments, instead of creating a contrast in the index of refraction along the curved boundary between second layer 520 and third layer 530, drawing refractive particles 525 to the boundary between the layers eliminates the contrast in index of refraction, thereby turning off the above-described lensing effect.

Figure 6:
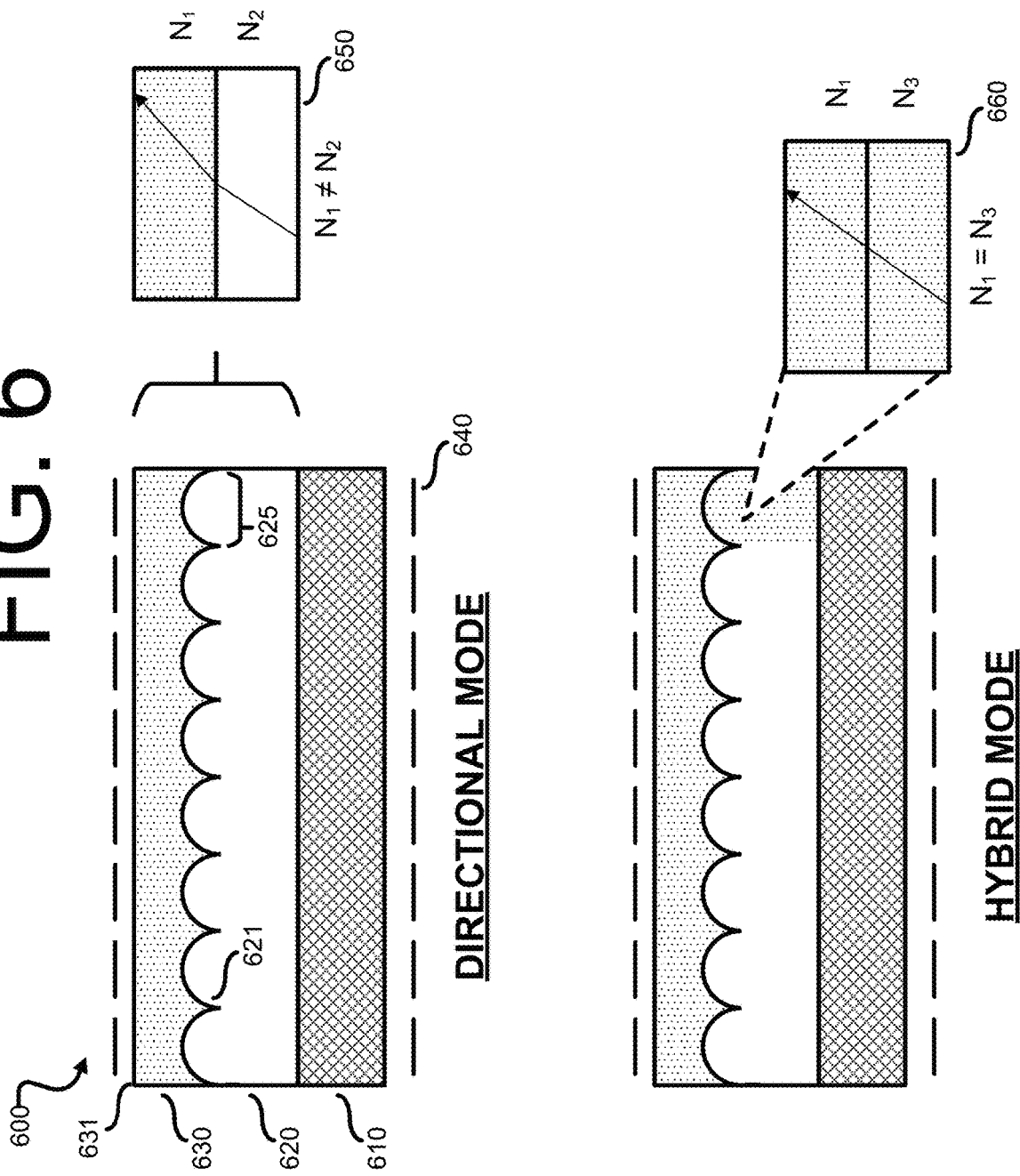
FIG. 6 illustrates components of a display apparatus supporting a directional display mode and a hybrid display mode according to embodiments of this disclosure.

FIG. 6 illustrates an example of components of a display apparatus supporting a directional display mode and a hybrid display mode according to certain embodiments of this disclosure. The embodiment of the display shown in FIG. 6 is for illustration only and other embodiments could be used without departing from the scope of the present disclosure.

Referring to the non-limiting example of FIG. 6, a lenticular layer 600 (for example, lenticular layer 220 of FIG. 2) is shown in a directional mode of operation, and in a hybrid mode of operation. According to certain embodiments, when lenticular layer 600 is operating in a directional mode of operation, the refractive effects associated with a change in an index of refraction along a curved boundary within lenticular layer 600 create a lensing effect that directs the output from a first set of pixels of a color filter feeding light to lenticular layer 600 towards a first range of viewing angles associated with a first directional display, and that directs the output from a second set of pixels of the color filter to lenticular layer 600 towards a second range of viewing angles associated with a second directional display. In various embodiments, when lenticular layer 600 is operating in a hybrid mode, the lensing effect is disabled, so that some portion(s) of a display apparatus (for example, display apparatus 200 in FIG. 2) provide a display whose appearance and resolution are not dependent on viewing angle, while other portions of the display apparatus provide directional displays, in which the content viewed depends on the viewer's viewing angle. According to certain embodiments, such a hybrid mode of operation may be applied in contexts where there is a content of common interest (for example, a breaking news item or a dangerous weather warning) to all viewers of the display apparatus.

According to certain embodiments, lenticular layer 600 comprises a first layer 610. The first layer 610 comprises a substantially flat sheet of transparent material having a substantially uniform index of refraction throughout first layer 610.

As shown in the non-limiting example of FIG. 6, the lenticular layer 600 further comprises a second layer 620. The second layer 620 further includes a section of material having an index of refraction that can be changed in response to a control signal (for example, application of a current through a region of liquid crystals whose index of refraction depends on the organization of the liquid crystals). Additionally, as shown in the illustrative example of FIG. 6, second layer 620 further comprises a curved surface 621 defining a plurality of lens elements (for example, lens element 625).

In certain embodiments, lenticular layer 600 includes a third layer 630. The third layer 630 includes a substantially flat surface 631, and a second surface following the contours of curved surface 621 of second layer 620. According to certain embodiments, third layer 630 is constructed of a material having an index of refraction ($N_1$) within the range of indices of refraction attainable by second layer 620.

Additionally, lenticular layer 600 comprises one or more arrays of control elements 640, which are configured to apply a control signal for changing the index of refraction within localized regions of second layer 620. In certain embodiments (for example, embodiments in which second layer 620 is constructed of a material comprising liquid crystals whose response to a current changes the index of refraction of the material), control elements 640 comprise one or more electrode pairs for passing a current through selected regions of second layer 620. In some embodiments (for example, embodiments in which the index of refraction of second layer 620 is a function of temperature), control elements 640 comprise localized heat sources. In some embodiments, (for example, embodiments utilizing refractive particles in a fluid or gel medium) control elements 640 comprise magnets or other components for applying a localized electromagnetic force in second layer 620.

While in the non-limiting example shown in FIG. 6, control elements 640 comprise electrode pairs disposed on opposite sides of lenticular layer 600, in certain embodiments according to this disclosure, control elements 640 may be provided on a single side of lenticular layer. In some embodiments, control elements 640 utilize in-plane switching (IPS).

As illustrated by graphic 650, when lenticular layer 600 is operating in a directional mode, there is a difference in the index of refraction between second layer 620 (shown as having index of refraction $N_2$) and third layer 630 (shown as having index of refraction $N_1$), along the curved boundary of the two layers, causing a lensing effect which produces two or more directional views.

According to certain embodiments, when operating in a hybrid mode, a control signal from control elements 640 changes the index of refraction within certain regions of second layer 620 to match the index of refraction of third layer 630, thereby selectively switching one or more portions of lenticular layer 600 from a directional mode to a single view mode. As shown in the illustrative example of FIG. 6, a control signal is applied to the region of lenticular layer 600 associated with lens element 625. As shown by graphic 660, in this region, the index of refraction within second layer 620 ($N_3$) matches the index of refraction of third layer 630 ($N_1$). In the absence of a change in refractive index along a curved boundary, the lensing effect creating directional displays is locally switched off.

FIG. 7 illustrates components of a display apparatus utilizing a birefringent material to support a directional display and single display modes according to some embodiments of this disclosure. The embodiment of the display shown in FIG. 7 is for illustration only and other embodiments could be used without departing from the scope of the present disclosure. According to certain embodiments, a lensing effect arising from a difference in the indices of refraction along a curved boundary between two layers (e.g., layers 720 and 730) of a lenticular layer (for example, layer 700) can be controlled by constructing at least one of the layers touching the curved boundary of a material whose index of refraction depends on the polarization axis of light passing through the material (e.g., a birefringent material, such as quartz, rutile, calcite, or polymers containing crystals of birefringent material).

In the non-limiting example shown in FIG. 7, a section of birefringent material 780 is depicted. According to various embodiments, birefringent material 780 receives one or more streams of light 781 having a variety of polarizations, and exhibits a different index of refraction depending on the polarization of the light. Referring to the non-limiting example of FIG. 7, for light 783 polarized in a "horizontal" direction, the index of refraction of birefringent material 780 matches that of the surrounding medium, and light polarized in the "horizontal" direction passes straight through birefringent material 780. By contrast, for light 785 polarized in a "vertical" direction, the index of refraction of birefringent material differs from that of the surrounding medium, and light 785 "bends" when passing through birefringent material 780.

FIG. 7 illustrates a lenticular layer 700 comprising a first layer 710, second layer 720 and third layer 730. According to certain embodiments, first layer 710 comprises a sheet of material (for example, plexiglass) having two substantially flat sides and a generally uniform index of refraction throughout the layer.

According to certain embodiments, first layer 710 contacts second layer 720 along a shared flat side of first layer 710. In some embodiments according to this disclosure, second layer 720 has a flat side contacting first layer 710 and a second, contoured side defining a lenticularly patterned cross section of the second layer. As shown in the non-limiting example of FIG. 7, second layer 720 comprises a layer of a birefringent material, having a first index of refraction for light polarized along a first axis of polarization, and a second index of refraction for light polarized along a second index of refraction.

In some embodiments, lenticular layer 700 comprises a third layer of material 730. According to certain embodiments, third layer of material has a substantially flat side 731, and a curved side 733 which contacts second layer 720 along the second contoured side of second layer 720. Additionally, in various embodiments, third layer of material 730 is substantially transparent and has an index of refraction which matches one of the first index of refraction or the second index of refraction of the birefringent material of second layer 720.

As an alternative to, or in addition to, switching between a directional display mode and a higher resolution single display mode by changing the index of refraction of second layer 720, certain embodiments instead switch between the two modes by changing the polarization of the light provided to lenticular layer 700. For example, to enable a directional mode, a polarizer polarizes light provided to lenticular layer 700 along an axis of polarization for which the index of refraction of second layer 720 is different than the index of refraction of third layer 730. In this way, the light passing through lenticular layer 700 experiences a change in refractive index along a curved boundary, causing a lensing effect. Similarly, to enable a single display mode, a polarizer polarizes the light provided to lenticular layer 700 along an axis of polarization for which the index of refraction of second layer 720 is the same as the index of refraction of third layer 730. Accordingly, there is no change in a refractive index along a curved boundary, and the lensing effect supporting directional displays is not present.

FIG. 8 illustrates components of a display apparatus utilizing a deformable lenticular array according to various embodiments of this disclosure. The embodiment of the display shown in FIG. 8 is for illustration only and other embodiments could be used without departing from the scope of the present disclosure. As an alternative to, or in addition to, switching between a directional mode and a single display mode by controlling aspects of the index of refraction of a first layer of material which contacts a second layer of material along a curved boundary, certain embodiments according to the present disclosure switch between one or more directional modes and a single display mode by controlling the shape of the boundary between two layers of material with dissimilar indices of refraction.

In the non-limiting example shown in FIG. 8, a lenticular layer 800 is illustrated in three modes of operation. The three modes of operation of the lenticular layer 800 include: a first directional mode, a second directional mode, and a single display mode.

According to various embodiments, lenticular layer 800 comprises a first layer 810. The first layer 810 is formed from a substantially flat sheet of transparent material that has a generally constant index of refraction throughout first layer 810. In certain embodiments, first layer 810 may be constructed of a material chosen for its stiffness and ability to resist deformation in response to an actuating force applied to second layer 820 to change the geometry of a boundary 825 between second layer 820 and third layer 830.

As shown in the non-limiting example of FIG. 8, lenticular layer 800 comprises second layer 820, which contacts first layer 810 along a substantially flat boundary 815, and contacts third layer 830 along a flexible, or deformable boundary 825. According to various embodiments, second layer 820 comprises a layer of material providing a fluid environment and having an index of refraction which is different than the index of refraction of third layer 830.

In certain embodiments according to this disclosure, boundary 825 is constructed from a thin layer of an elastic film. In some embodiments, second layer 820 and third layer 830 comprise layers of immiscible liquids.

As shown in the non-limiting example of FIG. 8, boundary 825 is deformable and can be shaped through the application of a mechanical force (for example, a pulling or compressive force on a film or other structural member defining the boundary between second layer 820 and third layer 830), or through audio transducers or other mechanisms for creating a standing wave along boundary 825. In this way, the contours of boundary 825 can be adjusted to support a first directional mode, wherein the geometry of lens elements formed by boundary 825 are associated with directional displays along a first set of viewing angles, as well as a second directional mode, associated with directional displays along a second set of viewing angles. Similarly, in some embodiments, boundary 825 can be allowed, or forced to assume a flat profile, removing any lensing effects and putting lenticular layer 800 in a single display mode.

FIG. 9 illustrates components of a display apparatus supporting a high refresh rate providing the appearance of enhanced resolution across directional displays according to certain embodiments of this disclosure. The embodiment of the display shown in FIG. 9 is for illustration only and other embodiments could be used without departing from the scope of the present disclosure.

As discussed elsewhere in this disclosure, in certain embodiments, operating a display apparatus in a directional mode (e.g., in a mode supporting two or more directional displays) can result in a reduction of the resolution of each directional display relative to the native resolution of the display apparatus. That is, in certain embodiments, each directional display has a resolution which is necessarily a fraction of the native resolution of the display device. For certain applications, such a reduction in resolution in the directional displays is, from a user's perspective, unimportant relative to the benefits of being able to present multiple directional displays on a single display apparatus. For other applications, making a directional display appear to have a resolution that is the same as, or similar to, the native resolution of the display apparatus presents significant technical benefits. According to certain embodiments, the perceived resolution of a directional display can be enhanced by mechanically shifting a lenticular array relative to a color filter at a rate synchronized with the refresh rate of the color filter. Further, in certain embodiments, the multiplexed directional display effect achieved by increasing the frame rate of the color filter in sync with a shift in the position of the color filter relative to a set of lens elements can also be achieved through a use of a shutter panel (for example, shutter panel 1220 of FIG. 12) to switch between sets of view angles.

Referring to the non-limiting example of FIG. 9, a section of lenticularly patterned material 900 is shown relative to a color filter 910. In certain embodiments, color filter 910 includes first pixel 920a and second pixel 920b. In this illustrative example, a display apparatus which includes a section of lenticularly patterned material 900 and color filter 910 is operating in a directional mode and supporting two directional displays. In the non-limiting example of FIG. 9, pixels providing content for the first directional display are identified with vertical crosshatching and pixels providing content for the second directional display are identified with white dots on a black field.

When color filter 910 is in a first position relative to section of lenticularly patterned material 900, the lensing effects associated with the geometry and change in index of refraction along the curved boundary of section of lenticularly patterned material 900 cause light from first pixel 920a to be steered towards a second directional display (represented dashed line 930b). Similarly, the above-described lensing effects direct light from second pixel 920b to be steered towards a first directional display (represented by dotted and dashed line 930a). Additionally, the lensing effect causes light from pixel 920c to appear in first directional display.

According to various embodiments, when color filter 910 is shifted by a predetermined amount (for example, a predetermined fraction of the spacing between first pixel 920a and second pixel 920b), the change in the relative position of color filter 910 to section of lenticularly patterned material 900 means that light from first pixel 920a is now steered towards first directional display. However, as illustrated in FIG. 9, to a viewer of the first directional display, the light from first pixel 920a when the color filter is in the second position appears at a location in the first directional display which is between the light from pixels 920b and 920c when the color filter is in the first position. In this way, shifting color filter 910 between the first and second positions causes pixels to appear in twice as many locations within the field of view of the first directional display.

In certain embodiments according to this disclosure, the perceived resolution of a directional display can be enhanced by increasing the refresh rate of color filter 910 and synchronizing the movement of color filter 910 between the first and second positions in sync with increased refresh rate of color filter 910. In this way, a display apparatus presents the first and second directional displays as a set of pixels mapped to a first set of locations within each directional display and a set of pixels mapped to a second set of locations within each directional display. Because the human eye and brain are not fast enough to accurately resolve the rapid changes in image data created by the increased refresh rate and the shift of color filter 910 between the first and second positions, the displayed images in the first and second directional displays are "multiplexed" in the viewer's brain as having pixel resolutions equivalent to the native resolution of the display apparatus.

Additionally, according to certain embodiments, a similarly multiplexing effect is achieved by physically shifting the entire display (rather than, for example, shifting a color filter relative to a lenticular array) a small amount and similarly increasing the refresh rate.

FIG. 10 illustrates components of a display apparatus comprising a switchable diffuser according to various embodiments of this disclosure. The embodiment of the display apparatus shown in FIG. 10 is for illustration only and other embodiments could be used without departing from the scope of the present disclosure. According to certain embodiments, a display apparatus (for example, display apparatus 200 of FIG. 2) can switch between a directional display mode and a single viewer mode using a switchable diffuser.

Referring to the non-limiting example of FIG. 10, a display apparatus 1000 includes, without limitation, a color filter 1010 (for example, color filter 210 of FIG. 2), which comprises first pixel 1015a and second pixel 1015b. According to certain embodiments, display apparatus 1000 further includes a section of lenticularly patterned material 1020, which has a substantially flat first side and a second side contoured to define an array of lens elements at a predetermined spacing.

In some embodiments according to the present disclosure, display apparatus 1000 further comprise a switchable diffuser 1030, which can increase or decrease the extent to which light passing through the diffuser is scattered in multiple directions (sometimes referred to as the "softness" of the light). According to various embodiments, switchable diffuser 1030 is an active diffuser panel analogous to those used by professional photographers and cinematic lighting technicians.

As shown in the non-limiting example of FIG. 10, when display apparatus 1000 is in a directional mode, switchable diffuser 1030 is off and the operation of lens elements within section of lenticularly patterned material 1020 steers or directs light from first pixel 1015a in a first direction 1017b associated with a second directional display. Similarly, when operating in directional mode, light from second pixel 1015b is steered or directed in a second direction 1017a associated with a first directional display.

In some embodiments, when display apparatus 1000 is in a single display mode, switchable diffuser 1030 is activated and operates to diffuse, or scatter, directional light passing through switchable diffuser 1030 across a plurality of directions. As illustrated in FIG. 10, while section of lenticularly patterned material 1020 initially steers light from first pixel 1015a in first direction 1017b, and light from second pixel 1015b in second direction 1017a, switchable diffuser 1030 "unsteers" the light, and diffuses light from both first pixel 1015a and second pixel 1015b across a range of viewing angles. According to certain embodiments, in single display mode, display apparatus 1000 provides a single display across a range of viewing angles. In some embodiments, in single display mode, display apparatus 1000 can cause color filter 1010 to present or display pixels inversely (relative to the original content) along a horizontal axis of color 1010, thereby preventing viewers from perceiving a horizontally inversed image. In some embodiments, subpixels, rather than full pixels can be reversed or inversed. While not shown in the illustrative example of FIG. 10, in certain embodiments, switchable diffuser 1030 may have a "cellular" construction, and be composed of a plurality of switchable diffusers, thereby allowing granular control of the diffusive properties of switchable diffuser 1030.

FIG. 11 illustrates components of a display apparatus 1100 comprising a switchable diffuser according to some embodiments of this disclosure. The embodiment of the display apparatus 1100 shown in FIG. 11 is for illustration only and other embodiments could be used without departing from the scope of the present disclosure. According to certain embodiments, a display apparatus (for example, display apparatus 200 of FIG. 2) can switch between a directional display mode and a single viewer mode using an electrowettable diffuser.

In the non-limiting example shown in FIG. 11, a display apparatus 1100 comprises a color filter 1110 (for example, color filter 1010 of FIG. 10) and a section of lenticularly patterned material 1120 (for example, section of lenticularly patterned material 1020 of FIG. 10). According to various embodiments, display apparatus 1100 further comprises a transparent substrate 1130 and one or more droplets of an electrowettable liquid 1140 that can diffuse light and whose wettability changes in response to a change in electric potential between liquid 1140 and transparent substrate 1130.

According to various embodiments, when display apparatus 1100 is operating in directional mode, the droplets of electrowettable liquid 1140 exhibit low wettability and do not fully cover transparent substrate 1130. Accordingly, the lensing effects created by section of lenticularly patterned material 1120 are substantially unaffected by the diffusive properties of electrowettable liquid 1140.

In certain embodiments, when display apparatus 1100 is operating in single display mode, a change of potential between transparent substrate 1130 and electrowettable liquid 1140 is created, causing the wettability of electrowettable liquid 1140 to increase, thereby substantially covering transparent substrate 1130 in a layer of electrowettable liquid 1140. Accordingly the diffusive properties of the created layer of electrowettable liquid 1140 undo the lensing effects of section of lenticularly patterned material 1120, producing a common display across a range of viewing angles.

While not shown in the illustrative example of FIG. 11, in certain embodiments, transparent substrate may have a "cellular" construction, and be composed of a plurality of electrically isolated (e.g., separated by an insulating layer) transparent substrates, thereby allowing granular control of the wettability of electrowettable liquid 1140.

FIG. 12 illustrates an example of components of a display apparatus 1200 supporting multiple viewing modes and comprising an active shutter panel. The embodiment of the display apparatus 1200 shown in FIG. 12 is for illustration only and other embodiments could be used without departing from the scope of the present disclosure.

In certain embodiments, the display apparatus 1200 includes a color filter 1210 (for example, color filter 210 of FIG. 2), and a shutter panel 1220. According to various embodiments, shutter panel 1220 comprises an array of shutter elements (for example, first shutter element 1225a, which is depicted as being in an "open" state, and second shutter element 1225b, which is depicted as being in a "closed" state and blocking the passage of light) which can controllably and selectively block or allow the passage of light from color filter 1210 to lenticular layer 1230. In some embodiments according to this disclosure, lenticular layer 1230 comprises a plurality of lens elements (for example, lens element 1235) defining a curved boundary of a layer with a given index of refraction, which produces a lensing effect associated with directional displays. Additionally, in certain embodiments, lenticular layer 1230 comprises a plurality of lands (for example, land 1237) defining a flat boundary of a layer with a given index of refraction, which does not produce a lensing effect associated with directional displays. In various embodiments according to this disclosure, display apparatus 1200 further comprises a switchable diffuser 1240 (for example, switchable diffuser 1030 of FIG. 10).

As shown in the non-limiting example of FIG. 12, when display apparatus 1200 is operating in a directional mode, switchable diffuser 1240 is in an "off" mode, wherein directional light entering switchable diffuser 1240 exits switchable diffuser in primarily the same direction of travel. Further, shutter panel 1220 is configured such that first shutter element 1225a is open and second shutter element 1225b is closed. Accordingly, light from first pixel 1211a and second pixel 1211b of color filter 1210 pass through the first shutter element 1225a, through lenticular layer 1230, where the curved boundary between regions of different indices of refraction created by lens element 1235 directs the light from first pixel 1211a towards a first directional display and the light from second pixel 1211b towards a second directional display.

In various embodiments according to this disclosure, display apparatus 1200 operates in a single display mode, wherein switchable diffuser 1240 is in an "on" state and shutter panel 1220 is configured such that first shutter element 1225a is closed and second shutter element 1225b is open. In the single display mode, light from pixels 1213a and 1213b of color filter 1210 passes through second shutter element 1225b, and through a region of lenticular layer 1230 which includes land 1237. As land 1237 defines a substantially flat boundary between regions having different indices of refraction, the lensing effect producing two or more directional displays when display apparatus 1200 is in directional mode does not occur, and the light from pixels 1213a and 1213b passes through lenticular layer 1230 in substantially parallel directions, and is subsequently diffused across a range of directions by switchable diffuser 1240.

Figure 13:
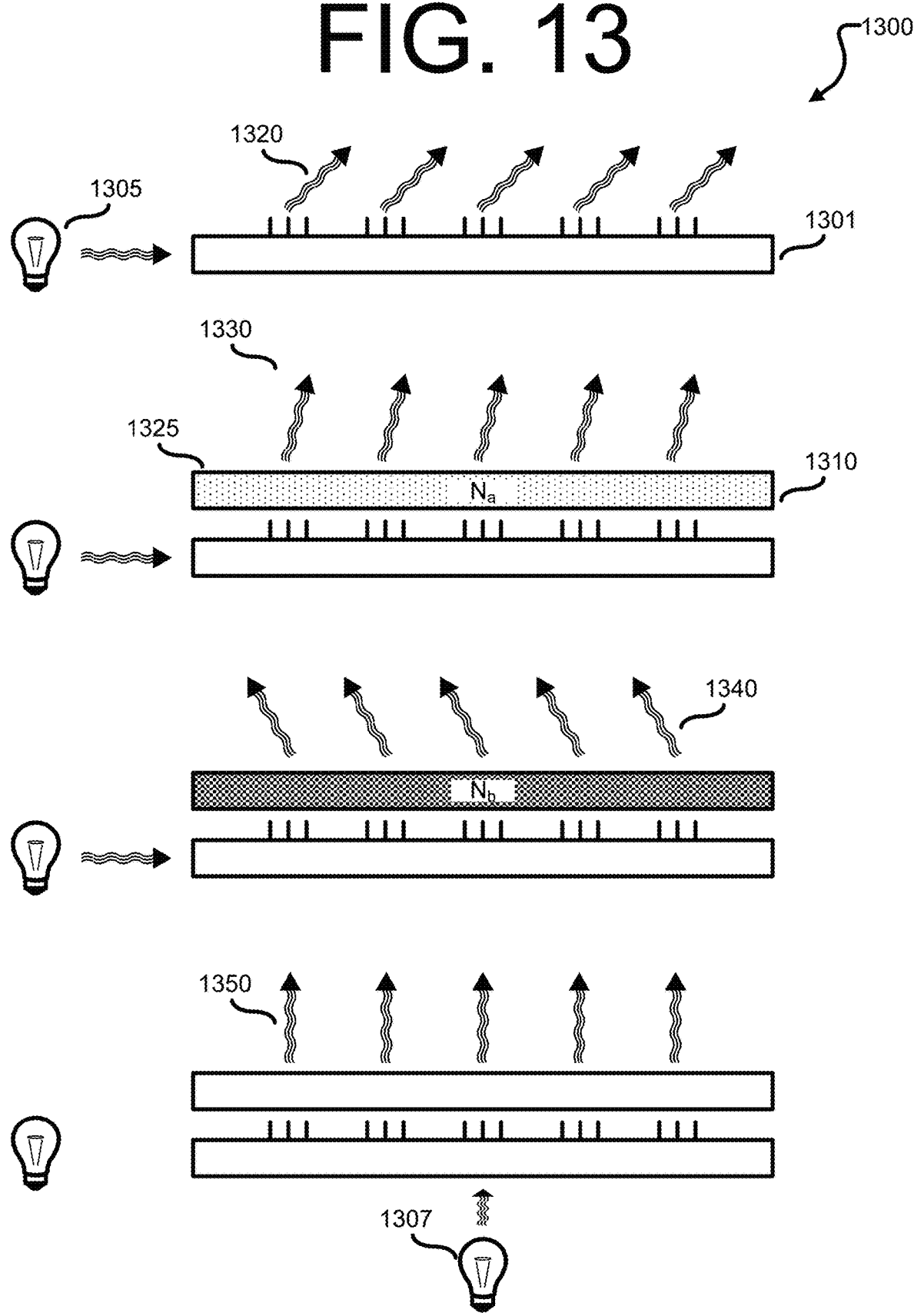
FIG. 13 illustrates components of a display apparatus supporting multiple viewing modes and comprising a switchable diffractive backlight, according to embodiments of this disclosure.

FIG. 13 illustrates components of a display apparatus supporting multiple viewing modes and comprising a switchable diffractive backlight. The embodiment of the display apparatus shown in FIG. 13 is for illustration only and other embodiments could be used without departing from the scope of the present disclosure. According to various embodiments of this disclosure, directional displays can be created without the use of a lenticular array or other optical structure to divide the output of a color filter or OLED array. In some embodiments, directional displays may be achieved by adjusting the direction of light passing through a generally non-diffusive color filter.

Referring to the non-limiting example shown in FIG. 13, The components of a switchable diffractive backlight 1300 comprise a light source 1305, a diffraction grating 1301, and a layer of material 1310 (for example, second layer 420 in FIG. 4) with a tunable index of refraction. According to various embodiments, light source 1305 comprises an electronic source (for example, an LED light) of light covering a range of wavelengths that overlaps the wavelengths covered by the pixels of a color filter.

As shown in the non-limiting example of FIG. 13, when diffraction grating 1301 is illuminated by light source 1305, the operation of grating 1301 causes the light to be emitted in a first direction 1320. Additionally, when a layer 1310 with a tunable index of refraction is place in the path of light emitted in first direction 1320, a boundary 1325 between a medium with a fixed index of refraction (for example, a region of air or glass between layer 1310 and a color filter (for example, color filter 210 in FIG. 2). Accordingly, when layer 1310 is set to a first index of refraction $N_a$, the difference in refraction index across boundary 1325 causes the light from light source 1305 to be emitted in a second direction 1330. Similarly, when layer 1320 is set to a second index of refraction $N_b$, the difference in index in refraction across boundary 1325 causes light from light source 1305 to be emitted in a third direction 1340.

Additionally, in various embodiments according to this disclosure, switchable diffractive backlight 1300 further comprises a second light source 1307, which, like first light source 1305 is an electronically controlled light source that emits light across a range of wavelengths which includes wavelengths to be controlled by the operation of a color filter (for example, color filter 210 in FIG. 2). According to various embodiments, diffractive grating 1301 is transparent and second light source 1307 is positioned to transmit light through diffraction grating at an angle which does not trigger the physical effects which cause light from first light source 1305 to be emitted in first direction 1320. Instead, light from second light source 1307 passes through diffraction grating 1301 and layer 1310 in a fourth direction 1350.

According to various embodiments, by switching between first backlight 1305 and second backlight 1307 and/or different indices of refraction of layer 1310, display apparatus incorporating switchable diffractive backlight 1300 can support two or more directional displays without relying on a lenticular layer or other lensing structure.

Figure 14:
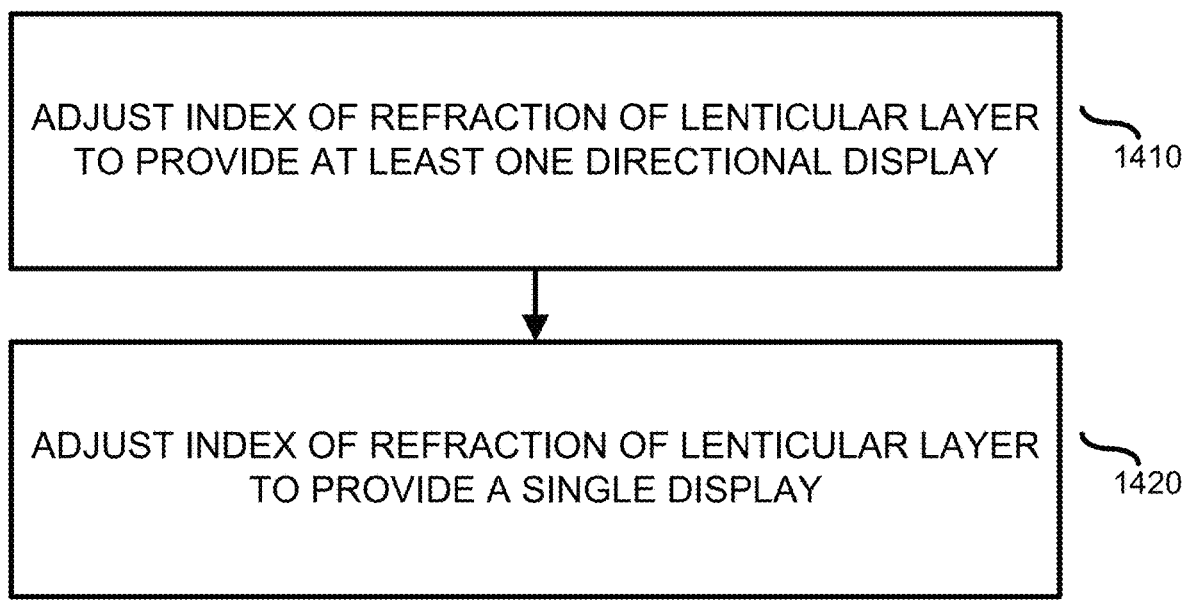
FIG. 14 illustrates a method for switching between a directional display mode and a single display mode according to embodiments of this disclosure.

FIG. 14 illustrates operations of a method 1400 for switching between a directional display mode and a single display mode according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by one or more processors in an electronic device having a display.

The method 1400 includes operations performed at a display apparatus (for example, display apparatus 200 in FIG. 2) which has a lenticular layer (for example, lenticular layer 400) which includes regions with an adjustable index of refraction abutting a curved boundary with a region of a medium having an index of refraction within a range of indices of refraction to which the lenticular layer can be adjusted (for example, second layer 420 in FIG. 2). According to certain embodiments, at operation 1410, the index of refraction of the lenticular layer is adjusted (for example, by applying a potential to a material whose index of refraction can be changed by applying a potential difference across liquid crystals within the material) to differ from the index of refraction of the medium along the curved boundary, thereby creating a lensing effect which produces at least one directional display.

According to certain embodiments, at operation 1420, the index of refraction of the lenticular layer is adjusted to match the index of refraction of the medium along the curved boundary (for example, the curved boundary between second layer 520 and third layer 530 in FIG. 5), thereby eliminating the lensing effect producing the at least one directional display. Instead, a single display is provided.

Figure 15:
FIG. 15 illustrates a method for switching between a directional display mode and a single display mode according to embodiments of this disclosure.

FIG. 15 illustrates operations of a method 1500 for switching between a directional display mode and a single display mode according to some embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. According to various embodiments, method 1500 is practiced on a display apparatus (for example, display apparatus 1000 in FIG. 10 or display apparatus 1100 in FIG. 11) comprising a backlit color filter (for example, color filter 1010 in FIG. 10) (or alternatively, an OLED array), a lenticular layer or section of lenticularly patterned material (for example, section of lenticularly patterned material 1020 in FIG. 10) which divides light from sets of pixels of the color filter into directional displays, and a switchable diffuser (for example, switchable diffuser 1030 in FIG. 10).

According to various embodiments, at operation 1510, the switchable diffuser is adjusted to an "off" state, in which the directionality of light coming from the pixels of the color filter is primarily determined by the lensing effects caused by the shape and index of refraction of the section of lenticularly patterned material, and at least one directional display is provided.

In some embodiments according to this disclosure, at operation 1520, the switchable diffuser is adjusted to an "on" state, wherein the directionality of light coming from the pixels of the color filter is primarily determined by the diffusive properties of the switchable diffuser, and a single display is provided.

Figure 16:
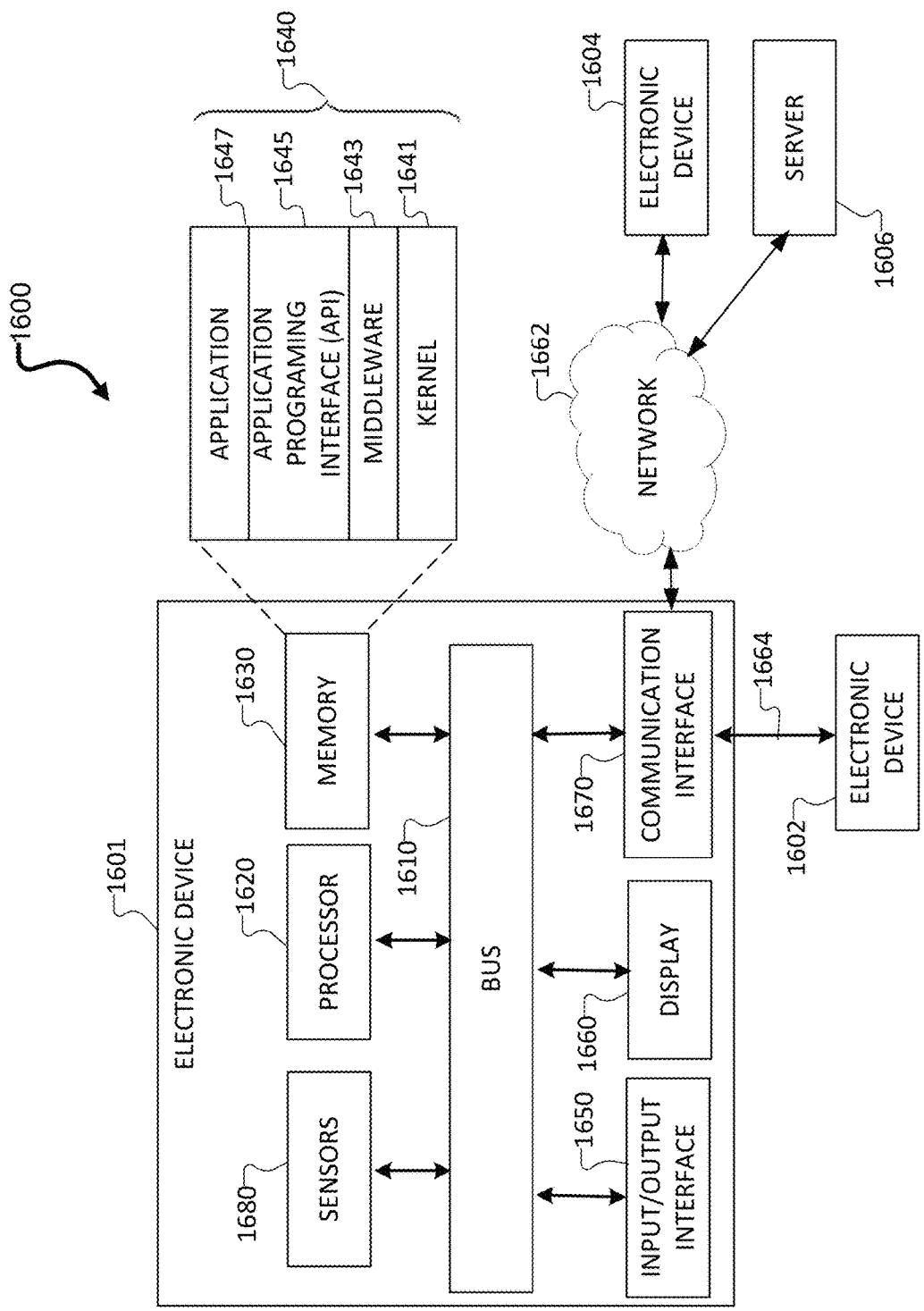
FIG. 16 illustrates an example network environment according to various embodiments of the present disclosure.

FIG. 16 illustrates an example network environment 1600 according to various embodiments of the present disclosure. The embodiment of the network environment 1600 shown in FIG. 16 is for illustration only. Other embodiments of the network environment 1600 could be used without departing from the scope of this disclosure.

According to an embodiment of the present disclosure, an electronic device 1601 is included in a network environment 1600. The electronic device 1601 can include at least one of a bus 1610, a processor 1620, a memory 1630, an input/output (IO) interface 1650, a display 1660, a communication interface 1670, or sensors 1680. In some embodiments, the electronic device 1601 can exclude at least one of the components or can add another component.

The bus 1610 includes a circuit for connecting the components 1620 to 1670 with one another and transferring communications (e.g., control messages and/or data) between the components.

The processor 1620 includes one or more of a central processing unit (CPU), an application processor (AP), or a communication processor (CP). The processor 1620 is able to perform control on at least one of the other components of the electronic device 1601, and/or perform an operation or data processing relating to communication.

The memory 1630 can include a volatile and/or non-volatile memory. For example, the memory 1630 can store commands or data related to at least one other component of the electronic device 1601. According to an embodiment of the present disclosure, the memory 1630 stores software and/or a program 1640. The program 1640 includes, e.g., a kernel 1641, middleware 1643, an application programming interface (API) 1645, and/or an application program (or "application") 1647. At least a portion of the kernel 1641, middleware 1643, or API 1645 can be denoted an operating system (OS).

For example, the kernel 1641 can control or manage system resources (e.g., the bus 1610, processor 1620, or a memory 1630) used to perform operations or functions implemented in other programs (e.g., the middleware 1643, API 1645, or application program 1647). The kernel 1641 provides an interface that allows the middleware 1643, the API 1645, or the application 1647 to access the individual components of the electronic device 101 to control or manage the system resources.

The middleware 1643 can function as a relay to allow the API 1645 or the application 1647 to communicate data with the kernel 1641, for example. A plurality of applications 1647 can be provided. The middleware 1643 is able to control work requests received from the applications 1647, e.g., by allocating the priority of using the system resources of the electronic device 1601 (e.g., the bus 1610, the processor 1620, or the memory 1630) to at least one of the plurality of applications 1647.

The API 1645 is an interface allowing the application 1647 to control functions provided from the kernel 1641 or the middleware 1643. For example, the API 1645 includes at least one interface or function (e.g., a command) for filing control, window control, image processing, or text control.

The IO interface 1650 serve as an interface that can, e.g., transfer commands or data input from a user or other external devices to other component(s) of the electronic device 1601. Further, the IO interface 1650 can output commands or data received from other component(s) of the electronic device 101 to the user or the other external device.

The display 1660 includes, e.g., a liquid crystal display (LCD), a light emitting diode (LED) display, an organic light emitting diode (OLED) display, or a microelectromechanical systems (MEMS) display, or an electronic paper display. The display 1660 is able to display, e.g., various contents (e.g., text, images, videos, icons, or symbols) to the user. The display 1660 can include a touchscreen and may receive, e.g., a touch, gesture, proximity or hovering input using an electronic pen or a body portion of the user. The display 1660 can be configured the same as or similar to the display apparatus 200 in FIG. 2.

For example, the communication interface 1670 is able to set up communication between the electronic device 1601 and an external electronic device (e.g., a first electronic device 1602, a second external electronic device 1604, or a server 1606). For example, the communication interface 1670 can be connected with the network 1662 or 1664 through wireless or wired communication to communicate with the external electronic device. The communication interface 1670 can be a wired or wireless transceiver or any other component for transmitting and receiving signals, such as video feeds or video streams.

Electronic device 1601 further includes one or more sensors 1680 that can meter a physical quantity or detect an activation state of the electronic device 1601 and convert metered or detected information into an electrical signal. For example, sensor 1680 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 1680 can further include a control circuit for controlling at least one of the sensors included therein. Any of these sensor(s) 180 can be located within the electronic device 1601. In some embodiments, a camera sensor 1680 can capture a plurality of frames for a single image to be combined by the processor 1620.

The first external electronic device 1602 or the second external electronic device 1604 can be a wearable device (for example, smart glasses, smart watch, etc.) or an electronic device 1601—mountable wearable device (e.g., an optical head mounted display (HMD), an HMD that mounts or includes the electronic device 1601, etc.). When the electronic device 1601 is mounted in an HMD (e.g., the electronic device 1602), the electronic device 1601 is able to detect the mounting in the HMD and operate in an augmented reality mode (or a virtual reality mode, a cross reality mode, an extended reality mode, etc.). In certain embodiments, the electronic device 1601 is able to detect the mounting in the HMD and operate in an augmented reality mode. When the electronic device 1601 is mounted in the electronic device 102 (e.g., the HMD), the electronic device 1601 can communicate with the electronic device 1602 through the communication interface 1670. The electronic device 1601 can be directly connected with the electronic device 1602 to communicate with the electronic device 1602 without involving a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 1662 includes at least one of communication networks. Examples of communication include a computer network (e.g., local area network (LAN) or wide area network (WAN)), Internet, or a telephone network.

The first and second external electronic devices 1602 and 1604 and server 1606 each can be a device of the same or a different type from the electronic device 1601. According to certain embodiments of the present disclosure, the server 1606 includes a group of one or more servers. According to certain embodiments of the present disclosure, all or some of operations executed on the electronic device 1601 can be executed on another or multiple other electronic devices (e.g., the electronic devices 1602 and 1604 or server 1606). According to certain embodiments of the present disclosure, when the electronic device 1601 should perform some function or service automatically or at a request, the electronic device 1601, instead of executing the function or service on its own or additionally, can request another device (e.g., electronic devices 1602 and 1604 or server 1606) to perform at least some functions associated therewith. The other electronic device (e.g., electronic devices 1602 and 1604 or server 1606) is able to execute the requested functions or additional functions and transfer a result of the execution to the electronic device 1601. The electronic device 1601 can provide a requested function or service by processing the received result as it is or additionally. To that end, a cloud computing, distributed computing, or client-server computing technique can be used, for example.

The server 1606 can support to drive the electronic device 1601 by performing at least one of operations (or functions) implemented on the electronic device 1601. For example, the server 1606 can include a processing module or processor that may support the processor 1620 implemented in the electronic device 1601.

For example, the electronic device 1601 can include an event processing module, such as within processor 1620. The event processing module can process at least part of information obtained from other elements (e.g., the processor 1620, the memory 1630, the input/output interface 1650, or the communication interface 1670) and can provide the same to the user in various manners. The server event processing module can include at least one of the components of the event processing module and perform (or instead perform) at least one of the operations (or functions) conducted by the event processing module.

For example, according to an embodiment of the present disclosure, the event processing module processes information related to an event, which is generated while the electronic device 1601 is mounted in a wearable device (e.g., the electronic device 1602) to function as a display apparatus and to operate in the augmented reality mode, to fit the augmented reality mode and display the processed information. When the event generated while operating in the augmented reality mode is an event related to running an application, the event processing module can block the running of the application or process the application to operate as a background application or process.

The event processing module can be separate from the processor 1620 or at least a portion of the event processing module can be included or implemented in the processor 1620 or at least one other module, or the overall function of the event processing module can be included or implemented in the processor 1620 shown or another processor. The event processing module can perform operations according to embodiments of the present disclosure in interoperation with at least one program 1640 stored in the memory 1630.

Although FIG. 16 shows that the electronic device 1601 includes the communication interface 1670 to communicate with the external electronic device 1604 or server 1606 via the network 1662, the electronic device 1601 can be independently operated without a separate communication function, according to an embodiment of the present disclosure. For example, in certain embodiments, electronic device 1601 may further comprise a graphics processing unit (GPU), which renders data for multidirectional display according to some embodiments of this disclosure.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus comprising:
    a display device comprising:
        a lenticular layer, the lenticular layer comprising (i) a first side, (ii) a second side opposite the first side, and (iii) particles in a fluid medium between the first and second sides of the lenticular layer, the second side of the lenticular layer comprising lens elements forming a lenticular array; and
        a color filter configured to shift in relation to the lenticular layer along a specified axis that is perpendicular to a direction of the lenticular layer from the color filter;
    wherein the particles of the lenticular layer are configured to move within the fluid medium such that (i) the lens elements are filled with the particles in a first mode or (ii) the lens elements are filled with the fluid medium in a second mode;
    wherein the display device is configured to operate as a directional display in one of the first and second modes and as a single display in another of the first and second modes;
    wherein a shape of the lens elements is adjustable using an actuating force on the lenticular layer; and
    wherein the display device is further configured to operate in a third mode as a hybrid display in which a first portion of the display device has a lensing effect enabled and a second portion of the display device has the lensing effect disabled.

2. The apparatus of claim 1, wherein the display device further comprises an additional layer contacting the second side of the lenticular layer.

3. The apparatus of claim 2, wherein:
    the fluid medium and the additional layer have a first index of refraction;
    the particles have a second index of refraction different from the first index of refraction;
    the display device is configured to operate as the directional display in the first mode; and
    the display device is configured to operate as the single display in the second mode.

4. The apparatus of claim 2, wherein:
    the particles and the additional layer have a first index of refraction;
    the fluid medium has a second index of refraction different from the first index of refraction;
    the display device is configured to operate as the directional display in the second mode; and
    the display device is configured to operate as the single display in the first mode.

5. The apparatus of claim 1, wherein the particles of the lenticular layer are configured to move within the fluid medium such that a layer of the fluid medium separates the particles filling the lens elements from the first side of the lenticular layer in the first mode.

6. The apparatus of claim 1, wherein:
the display device further comprises a backlight; and
the color filter is disposed between the backlight and the lenticular layer.

7. The apparatus of claim 1, wherein the display device is configured in the third mode to operate the first portion of the display device as the directional display and the second portion of the display device as the single display.

8. A system comprising:
a display device comprising:
a lenticular layer, the lenticular layer comprising (i) a first side, (ii) a second side opposite the first side, and (iii) particles in a fluid medium between the first and second sides of the lenticular layer, the second side of the lenticular layer comprising lens elements forming a lenticular array; and
a color filter configured to shift in relation to the lenticular layer along a specified axis that is perpendicular to a direction of the lenticular layer from the color filter; and
at least one processor configured to selectively control whether the display device operates in a first mode, a second mode, or a third mode;
wherein the particles of the lenticular layer are configured to move within the fluid medium such that (i) the lens elements are filled with the particles in the first mode or (ii) the lens elements are filled with the fluid medium in the second mode;
wherein the display device is configured to operate as a directional display in one of the first and second modes and as a single display in another of the first and second modes;
wherein a shape of the lens elements is adjustable using an actuating force on the lenticular layer; and
wherein the display device is further configured to operate in the third mode as a hybrid display in which a first portion of the display device has a lensing effect enabled and a second portion of the display device has the lensing effect disabled.

9. The system of claim 8, wherein the display device further comprises an additional layer contacting the second side of the lenticular layer.

10. The system of claim 9, wherein:
the fluid medium and the additional layer have a first index of refraction;
the particles have a second index of refraction different from the first index of refraction;
the display device is configured to operate as the directional display in the first mode; and
the display device is configured to operate as the single display in the second mode.

11. The system of claim 9, wherein:
the particles and the additional layer have a first index of refraction;
the fluid medium has a second index of refraction different from the first index of refraction;
the display device is configured to operate as the directional display in the second mode; and
the display device is configured to operate as the single display in the first mode.

12. The system of claim 8, wherein the particles of the lenticular layer are configured to move within the fluid medium such that a layer of the fluid medium separates the particles filling the lens elements from the first side of the lenticular layer in the first mode.

13. The system of claim 8, wherein:
the display device further comprises a backlight; and
the color filter is disposed between the backlight and the lenticular layer.

14. The system of claim 8, wherein the display device is configured to in the third mode to operate the first portion of the display device as the directional display and the second portion of the display device as the single display.

15. A method for controlling a display device comprising a lenticular layer and a color filter, the lenticular layer comprising (i) a first side, (ii) a second side opposite the first side, and (iii) particles in a fluid medium between the first and second sides of the lenticular layer, the second side of the lenticular layer comprising lens elements forming a lenticular array, the method comprising:
at least one of:
moving the particles within the fluid medium such that the lens elements are filled with the particles in a first mode; or
moving the particles within the fluid medium such that the lens elements are filled with the fluid medium in a second mode;
adjusting a shape of the lens elements using an actuating force on the lenticular layer;
shifting the color filter in relation to the lenticular layer along a specified axis that is perpendicular to a direction of the lenticular layer from the color filter;
operating the display device as a directional display in one of the first and second modes and as a single display in another of the first and second modes; and
operating the display device in a third mode as a hybrid display in which a first portion of the display device has a lensing effect enabled and a second portion of the display device has the lensing effect disabled.

16. The method of claim 15, wherein the display device further comprises an additional layer contacting the second side of the lenticular layer.

17. The method of claim 16, wherein:
the fluid medium and the additional layer have a first index of refraction;
the particles have a second index of refraction different from the first index of refraction; and
the method further comprises:
operating the display device as the directional display in the first mode; and
operating the display device as the single display in the second mode.

18. The method of claim 16, wherein:
the particles and the additional layer have a first index of refraction;
the fluid medium has a second index of refraction different from the first index of refraction; and
the method further comprises:
operating the display device as the directional display in the second mode; and
operating the display device as the single display in the first mode.

19. The method of claim 15, further comprising:
moving the particles of the lenticular layer within the fluid medium such that a layer of the fluid medium separates the particles filling the lens elements from the first side of the lenticular layer in the first mode.

20. The method of claim 15, wherein:
the display device further comprises a backlight; and the color filter is disposed between the backlight and the lenticular layer.

\* \* \* \* \*